(12) United States Patent
Okazaki

(10) Patent No.: US 9,235,083 B2
(45) Date of Patent: Jan. 12, 2016

(54) LIQUID CRYSTAL DISPLAY DEVICE

(71) Applicant: Sharp Kabushiki Kaisha, Osaka-shi, Osaka (JP)

(72) Inventor: Tsuyoshi Okazaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/384,815

(22) PCT Filed: Mar. 12, 2013

(86) PCT No.: PCT/JP2013/056814
§ 371 (c)(1),
(2) Date: Sep. 12, 2014

(87) PCT Pub. No.: WO2013/137254
PCT Pub. Date: Sep. 19, 2013

(65) Prior Publication Data
US 2015/0049269 A1    Feb. 19, 2015

(30) Foreign Application Priority Data
Mar. 13, 2012  (JP) ................................ 2012-055910

(51) Int. Cl.
*G02F 1/1337* (2006.01)
*G02F 1/1343* (2006.01)

(52) U.S. Cl.
CPC ........ *G02F 1/1337* (2013.01); *G02F 1/134363* (2013.01); *G02F 1/133788* (2013.01); *G02F 2001/133757* (2013.01)

(58) Field of Classification Search
CPC ............ G02F 1/133788; G02F 1/1337; G02F 2001/133757; G02F 1/134363
See application file for complete search history.

(56) References Cited

U.S. PATENT DOCUMENTS

| 5,946,067 | A | 8/1999 | Kim et al. |
| 6,297,866 | B1 * | 10/2001 | Seo ................... G02F 1/134363 349/141 |
| 6,583,839 | B2 | 6/2003 | Suzuki et al. |
| 7,688,411 | B2 | 3/2010 | Kim et al. |
| 2011/0102720 | A1 | 5/2011 | Mizusaki et al. |

FOREIGN PATENT DOCUMENTS

| JP | 3120751 B2 | 12/2000 |
| JP | 2013-117700 A | 6/2013 |
| WO | 2009/157207 A1 | 12/2009 |

OTHER PUBLICATIONS

Official Communication issued in International Patent Application No. PCT/JP2013/056814, mailed on Apr. 23, 2013.

* cited by examiner

Primary Examiner — Dung Nguyen
Assistant Examiner — Tai Duong
(74) Attorney, Agent, or Firm — Keating & Bennett, LLP

(57) ABSTRACT

In a liquid crystal display device of a lateral electric field mode including a first substrate (50) and a second substrate (60) having a liquid crystal layer (70) therebetween, a first electrode (18) and a second electrode (16) located in the first substrate, and an alignment film (28) provided to be in contact with the liquid crystal layer; the alignment film (28) includes a first alignment region that aligns liquid crystal molecules in a first domain (P1) in a first alignment axis azimuth (D1), a second alignment region that aligns liquid crystal molecules in a second domain (P2) in a second alignment axis azimuth (D2), a third alignment region that aligns liquid crystal molecules in a third domain (P3) in the first alignment axis azimuth (D1), and a fourth alignment region that aligns liquid crystal molecules in a fourth domain (P4) in the second alignment axis azimuth (D2). The liquid crystal molecules in the first domain, the second domain, the third domain and the fourth domain are all rotated in the same direction.

15 Claims, 22 Drawing Sheets

FIG.5
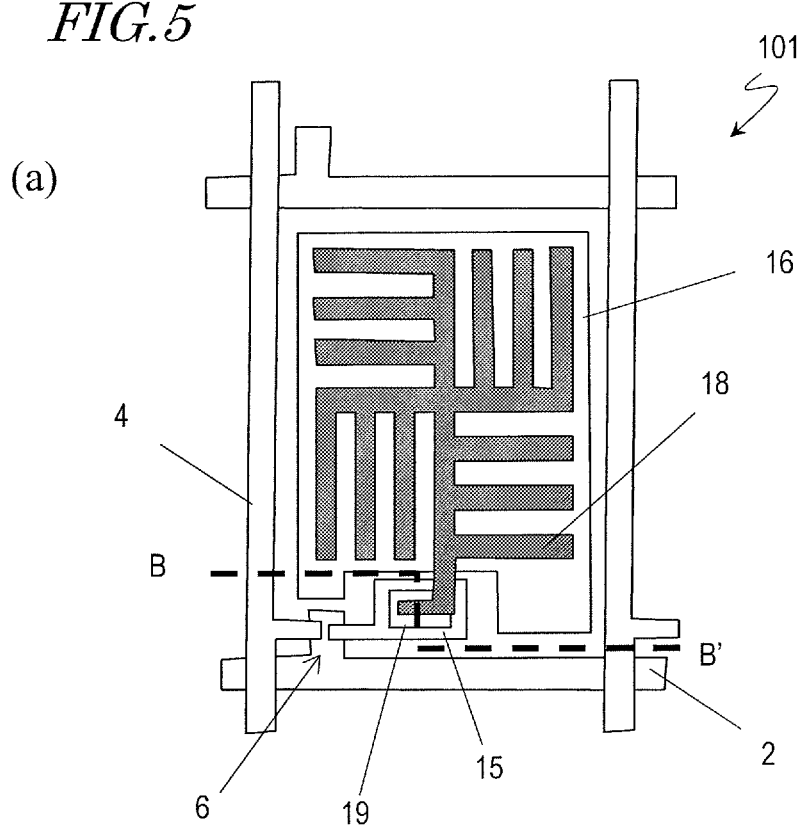
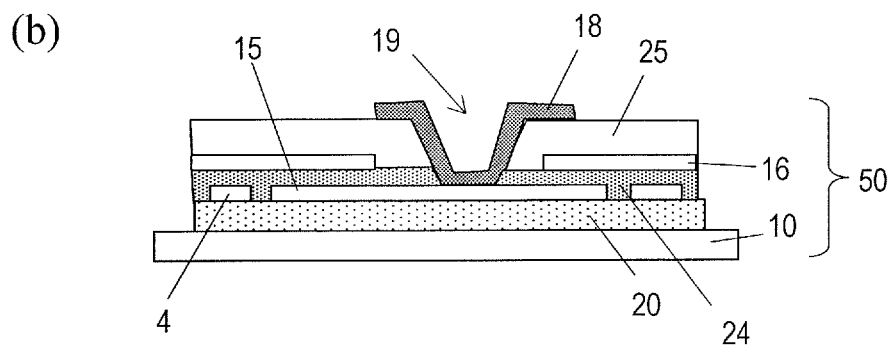

FIG.8
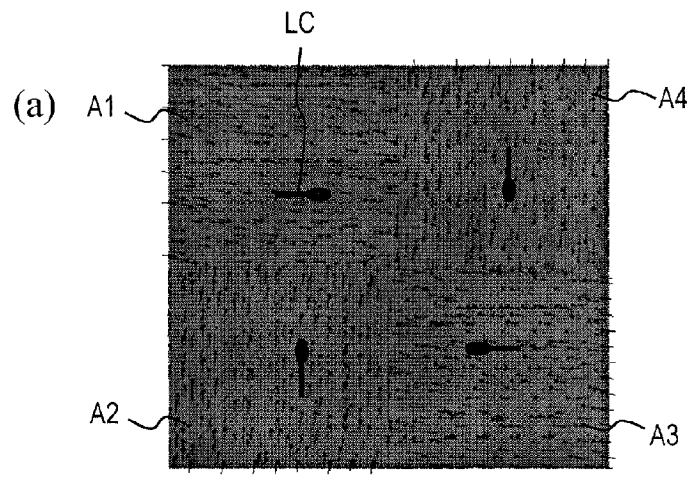
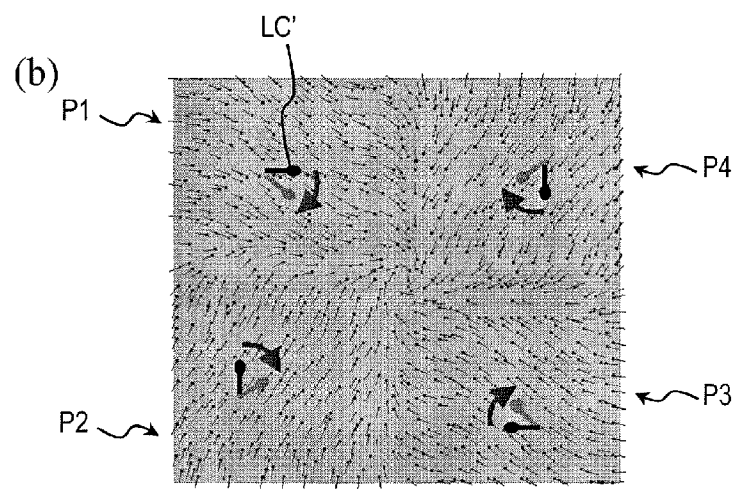
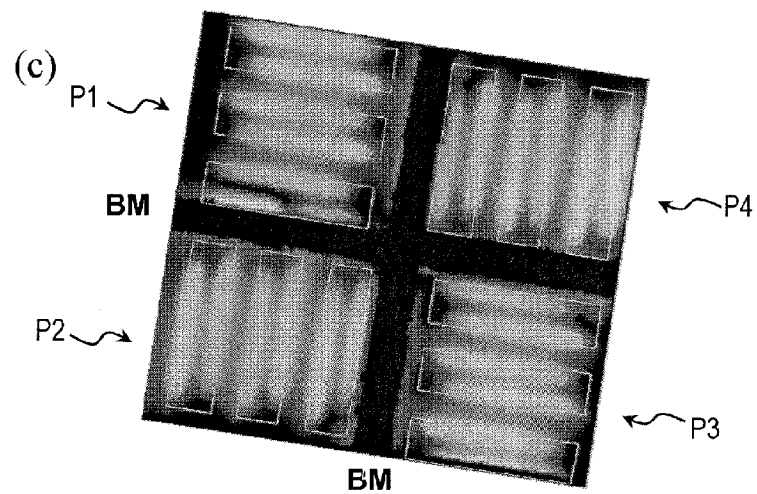

FIG.10
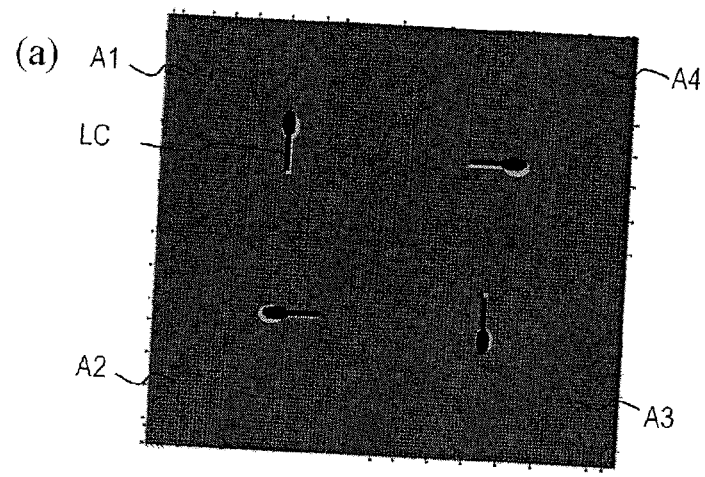
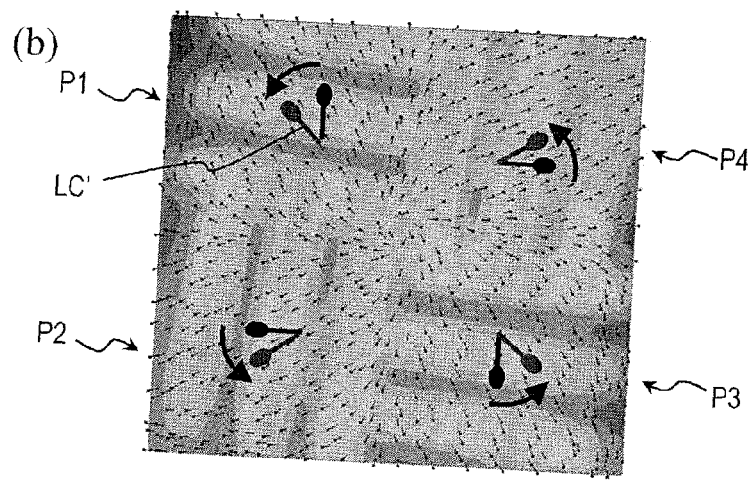
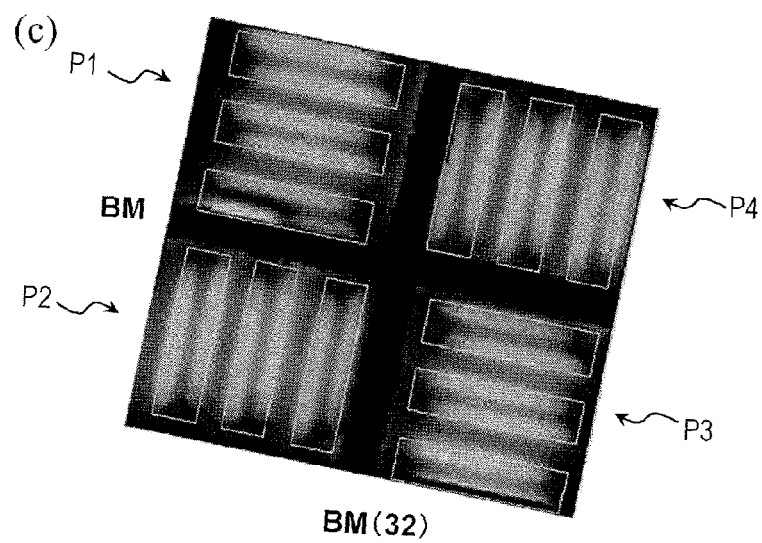

FIG.12
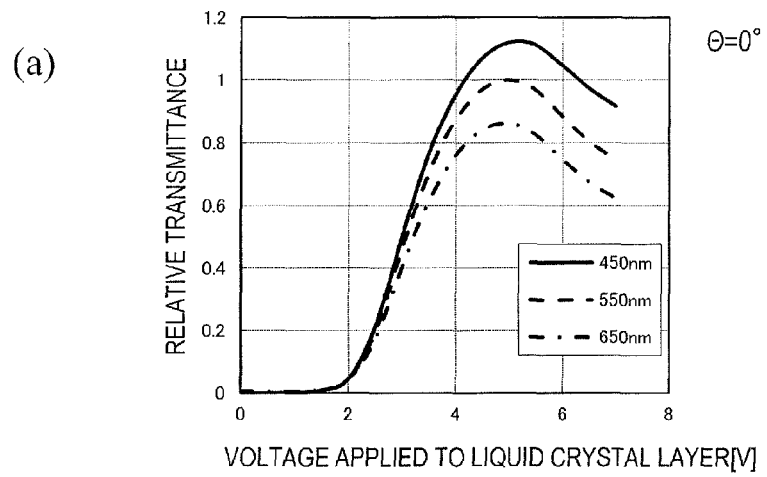
(a) Θ=0°
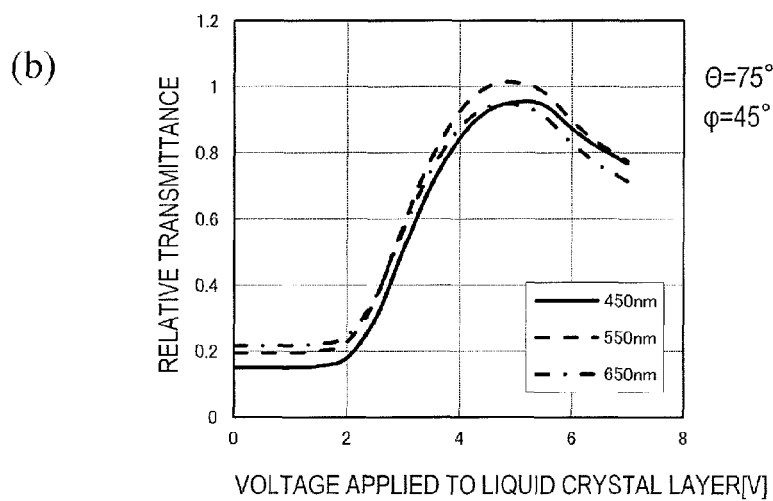
(b) Θ=75° φ=45°
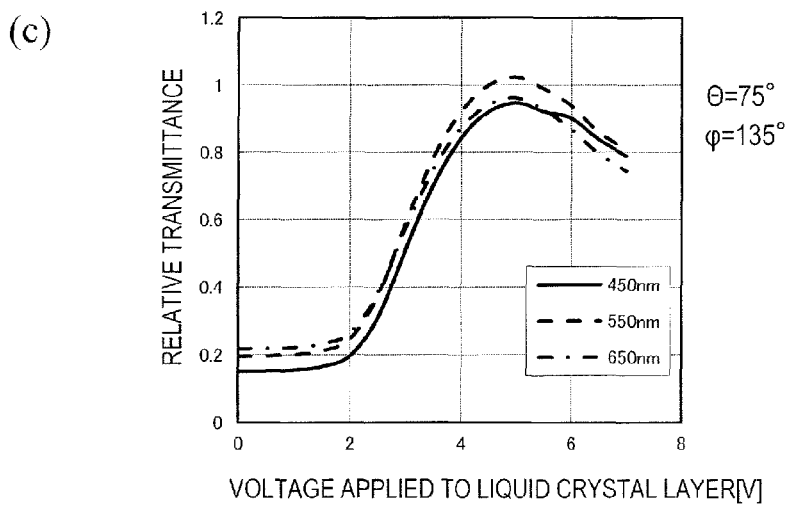
(c) Θ=75° φ=135°

*FIG.14*
(a) 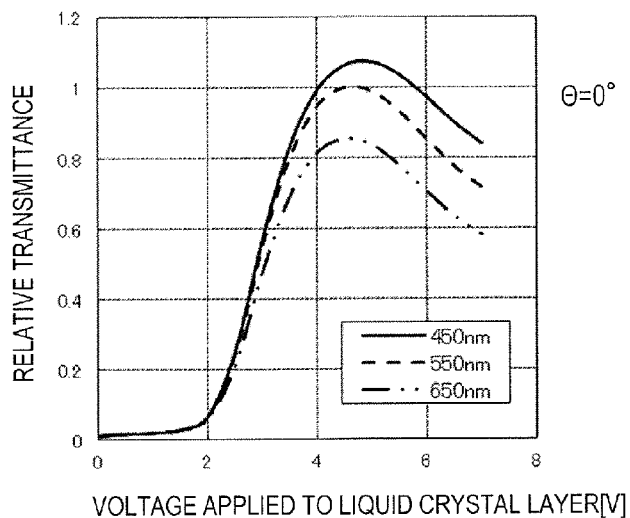
(b) 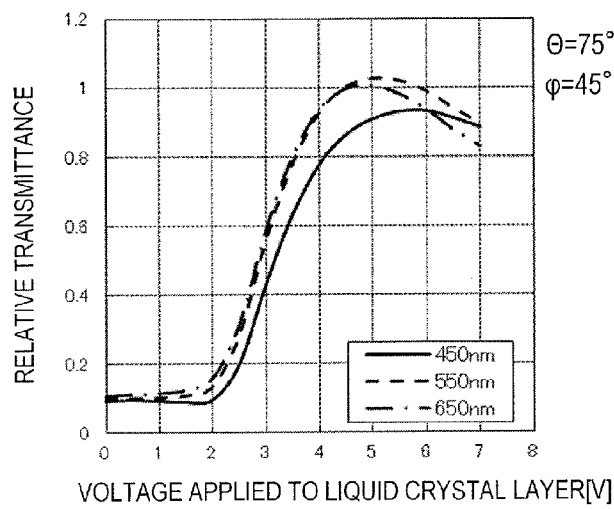
(c) 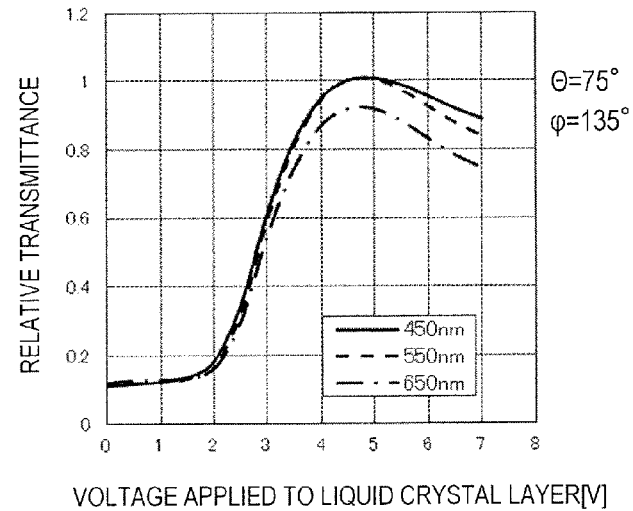

FIG.20
(a) 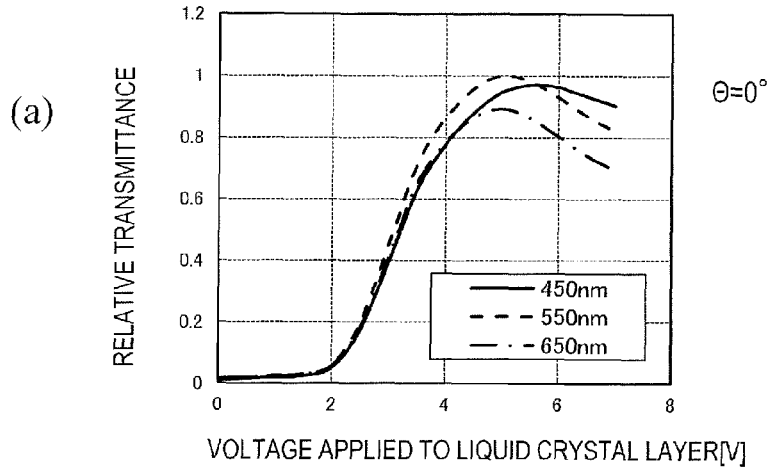
Θ=0°
(b) 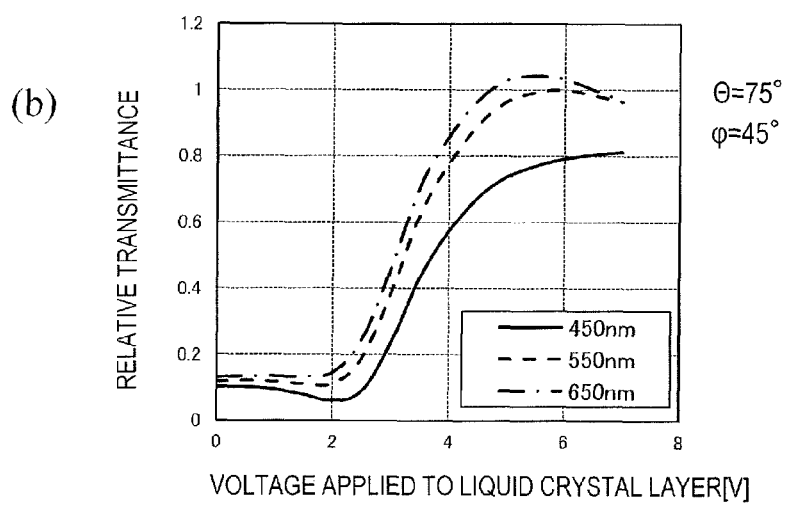
Θ=75°
φ=45°
(c) 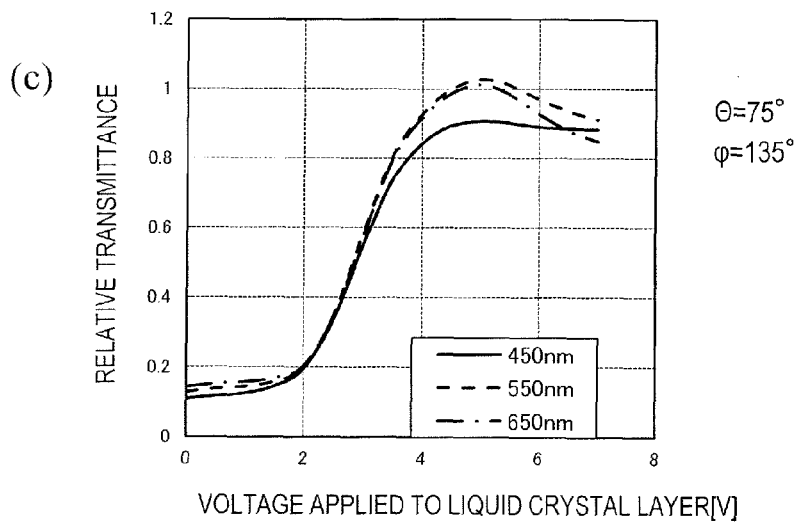
Θ=75°
φ=135°

FIG.21
(a) 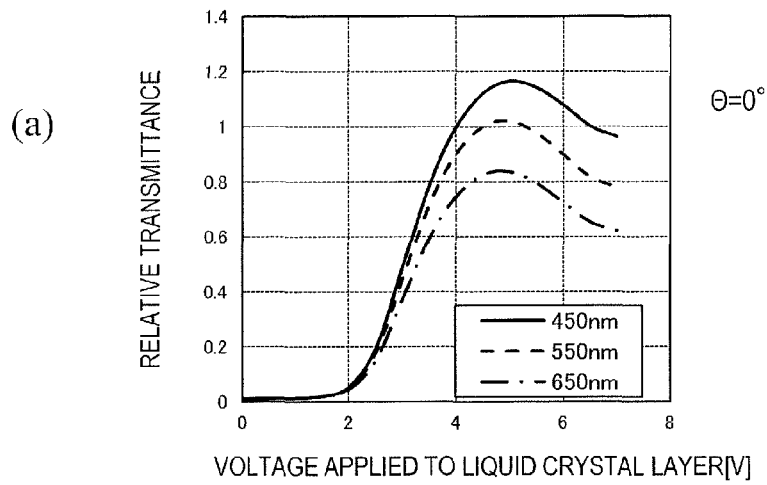
(b) 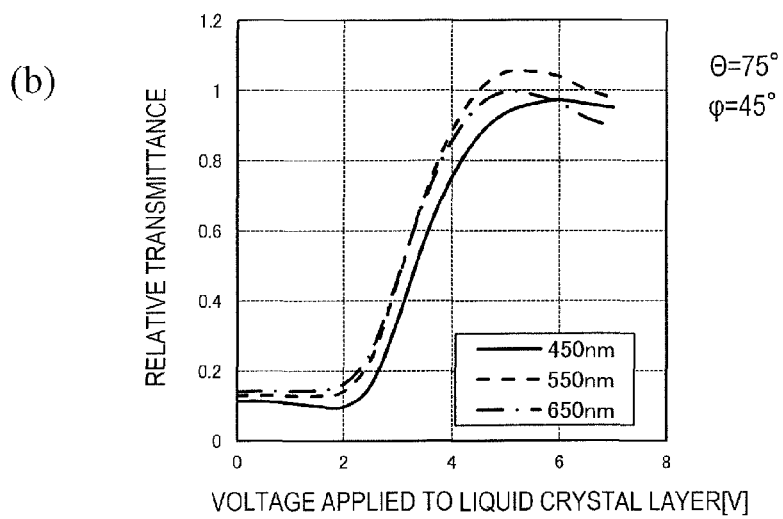
(c) 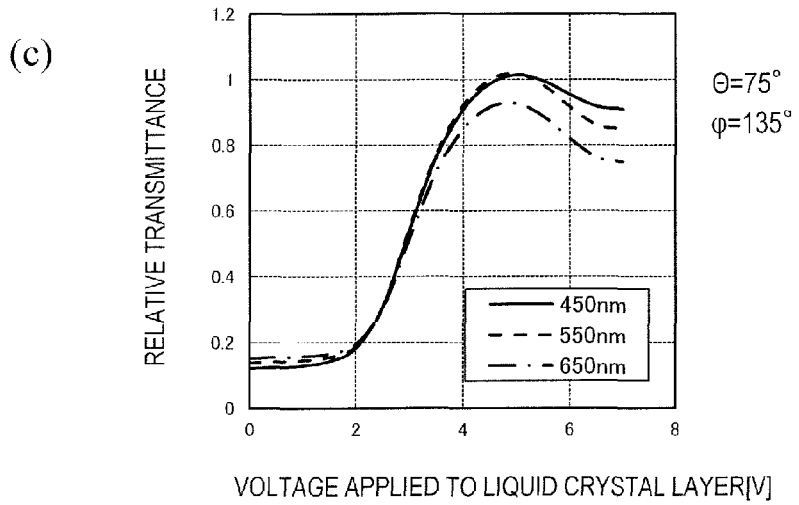

LIQUID CRYSTAL DISPLAY DEVICE

TECHNICAL FIELD

The present invention relates to a liquid crystal display device, and more particularly to a liquid crystal display device of a lateral electric field mode.

BACKGROUND ART

Liquid crystal display devices are improving in performance with expansion of their applications. In particular, display modes with wide viewing angle characteristics, for example, MVA (Multi-domain Vertical Alignment) and IPS (In Plane Switching), have been developed, and are undergoing further improvements.

In recent years, liquid crystal display devices of an FFS (Fringe Field Switching) mode, which is an extended form of the IPS mode, have also been developed. In the IPS mode and the FFS mode, an electric field is generated in an in-plane direction (or an oblique direction) by using electrodes which are provided on one of the substrates between which a liquid crystal layer is interposed, and this electric field causes liquid crystal molecules to be rotated in the substrate plane to provide display. These display modes are also referred to as a lateral electric field mode (lateral electric field method).

According to a known driving method for a liquid crystal display device of a lateral electric field mode, liquid crystal molecules in each pixel are rotated uniformly such that major axes thereof are aligned in the same direction in the presence of an applied voltage. However, in the state where the liquid crystal molecules are aligned in the same direction, the difference in the refractive index between the major axis direction and the minor axis direction of a liquid crystal molecule results in a so-called color shift. This is a phenomenon that the color of display appears different when viewed from an oblique direction, as compared with when viewed from the front.

As a device that suppresses such a color shift, a liquid crystal display device of a dual domain mode, in which two domains are provided in each pixel, is known. In such a liquid crystal display device, two sub pixel regions which are different in terms of the electrode structure (specifically, the direction in which slits made in a pixel electrode extend, etc.) are provided in each pixel. In the presence of an applied voltage, liquid crystal molecules are rotated in opposite directions in the two different sub pixel regions. As a result, two liquid crystal domains are formed in correspondence with the two sub pixel regions.

In a typical liquid crystal display device of a dual domain mode, when a maximum voltage is applied, two domains are formed in which directors of liquid crystal molecules are substantially orthogonal to each other. In the state where the directors are substantially orthogonal to each other, the liquid crystal molecules are prevented from being viewed only in a specific direction thereof (e.g., direction which is parallel to the major axis direction). As a result, deviating apparent retardations are mutually compensated for, and thus a color shift is suppressed.

Patent Document 1 discloses a liquid crystal display device of an IPS mode in which a plurality of domains are formed. In this liquid crystal display device, the initial alignment direction of liquid crystal molecules is set to be 45° in all pixels, and elongated electrodes in two adjacent pixels extend in different directions from each other. For example, the elongated electrode in one pixel is set to extend in a direction parallel to gate bus lines (horizontal direction) whereas the elongated electrode in a pixel adjacent to the one pixel is set to extend in a direction parallel to source bus lines (vertical direction). When a voltage is applied to these two pixels, the directions of electric fields generated by the elongated electrodes in these two pixels are different from each other by 90°. Therefore, the liquid crystal molecules in these pixels are aligned in opposite directions to each other. Namely, in two adjacent pixels, the alignment directions of the liquid crystal molecules in the presence of an applied voltage are different from each other, which suppresses a color shift.

Patent Document 1 also discloses a structure in which the pixel electrode structure is different as described above between two pixels adjacent to each other in the horizontal direction and also between two pixels adjacent to each other in the vertical direction. Two pixels adjacent to each other in an oblique direction have the same pixel electrode structure. In such a structure, the liquid crystal molecules are rotated in the same direction in the two pixels adjacent to each other in an oblique direction. By contrast, pixels in which the liquid crystal molecules are rotated in different directions from each other are arrayed alternately in the horizontal direction and in the vertical direction.

Patent Document 2 discloses a liquid crystal display device of an IPS mode or an FFS mode in which four liquid crystal domains are formed in each pixel in the presence of an applied voltage. In this liquid crystal display device, four regions in which the directions of the electric fields are different are provided in each pixel. In two predetermined regions among the four regions, the directions of the electric fields are symmetrical with respect to the rubbing direction, and the liquid crystal molecules are rotated in opposite directions to each other. In the other two regions, the directions of the electric fields are symmetrical with respect to the rubbing direction although the angle of the directions of the electric fields with respect to the rubbing direction is different from that in the above two regions, and the liquid crystal molecules are rotated in opposite directions to each other. Namely, two types of regions each including two regions in which the liquid crystal molecules are rotated in opposite directions to each other are provided.

CITATION LIST

Patent Literature

[Patent Document 1] U.S. Pat. No. 5,946,067
[Patent Document 2] U.S. Pat. No. 7,688,411
[Patent Document 3] Japanese Patent No. 3120751
[Patent Document 4] International Publication No. 2009/157207

SUMMARY OF INVENTION

Technical Problem

With the liquid crystal display devices described in Patent Documents 1 and 2, a color shift during white display can be compensated for, but it is difficult to compensate for a color shift during display of black to any grayscale tone (especially, during display of a low gray scale level tone). For example, in the case where the initial alignment direction of liquid crystal molecules is set to one direction through rubbing or the like, the liquid crystal molecules have substantially the same alignment direction in the absence of an applied voltage or under a low voltage. In this case, depending on the angle (azimuth) at which the display is viewed, the color may appear yellowish or bluish.

Patent Document 3 discloses a liquid crystal display device of an IPS mode. In this liquid crystal display device, each pixel includes two regions in which the initial alignment directions of liquid crystal molecules in the absence of an applied voltage are substantially orthogonal to each other as a result of multi-division processing. In the liquid crystal display device described in Patent Document 3, in two sub pixel regions included in a dual domain structure, the initial alignment directions of the liquid crystal molecules are different from each other by about 90°. When an optional level of voltage is applied, the liquid crystal molecules are rotated in the same direction while keeping the state where the alignment directions thereof in the two domains are different from each other by about 90°.

However, Patent Document 3 merely describes that the initial alignment directions are different from each other by about 90° in two domains adjacent to each other in an up-down direction in each pixel, but does not describe a pixel including three or more domains.

The present invention made in light of the above-described problems has an object of improving viewing angle characteristics in a liquid crystal display device of a lateral electric field mode including three or more domains.

Solution to Problem

A liquid crystal display device in an embodiment according to the present invention is a liquid crystal display device of a lateral electric field mode, including: a liquid crystal layer; first and second substrates facing each other with the liquid crystal layer interposed therebetween; first and second polarizers located respectively in the first and second substrates; a first electrode and a second electrode located in the first substrate on the side of the liquid crystal layer; and a first alignment film provided between the first electrode/the second electrode and liquid crystal layer so as to be in contact with the liquid crystal layer, the first alignment film regulating an alignment axis direction of liquid crystal molecules in the absence of an applied voltage. The liquid crystal layer includes a first domain and a second domain mutually differing in terms of alignment axis azimuth of the liquid crystal molecules in the presence of an applied voltage, and also includes a third domain and a fourth domain mutually differing in terms of alignment axis azimuth of the liquid crystal molecules in the presence of an applied voltage. The first domain and the second domain are arrayed in a vertical direction, the third domain and the fourth domain are arrayed in the vertical direction, the first domain and the fourth domain are arrayed in a horizontal direction, and the second domain and the third domain are arrayed in the horizontal direction. The first alignment film includes a first alignment region that aligns the liquid crystal molecules in the first domain in a first alignment axis azimuth, a second alignment region that aligns the liquid crystal molecules in the second domain in a second alignment axis azimuth substantially orthogonal to the first alignment axis azimuth, a third alignment region that aligns the liquid crystal molecules in the third domain in the first alignment axis azimuth, and a fourth alignment region that aligns the liquid crystal molecules in the fourth domain in the second alignment axis azimuth. When a voltage is applied between the first electrode and the second electrode, the liquid crystal molecules in the first domain, the second domain, the third domain and the fourth domain are all rotated in the same direction.

In an embodiment, the liquid crystal display device further includes a source bus line and a gate bus line for applying a voltage to the first electrode. A direction in which at least one of the source bus line and the gate bus line extends is parallel to one of the first alignment axis azimuth and the second alignment axis azimuth.

In an embodiment, the first electrode has a first elongated electrode portion or slit in correspondence with the first domain, the first elongated electrode portions extending in a first direction; a second elongated electrode portion or slit in correspondence with the second domain, the second elongated electrode portion extending in a second direction different from the first direction; a third elongated electrode portion or slit in correspondence with the third domain, the third elongated electrode portion extending in the first direction; and a fourth elongated electrode portion or slit in correspondence with the fourth domain, the fourth elongated electrode portion extending in the second direction.

In an embodiment, the first direction is offset by an angle of greater than 0° and 10° or less in a first rotation direction with respect to either the first alignment axis azimuth or the second alignment axis azimuth, and the second direction is offset by an angle of greater than 0° and 10° or less in the first rotation direction with respect to either the second alignment axis azimuth or the first alignment axis azimuth.

In an embodiment, the first electrode includes a plurality of the first elongated electrode portions in correspondence with the first domain, the plurality of first elongated electrode portions each extending in the first direction and electrically connected to each other, and includes a plurality of the second elongated electrode portions in correspondence with the second domain, the plurality of second elongated electrode portions each extending in the second direction and electrically connected to each other. The plurality of second elongated electrode portions are connected to one of the plurality of first elongated electrode portions that is located at a boundary between the first domain and the second domain.

In an embodiment, the first, second, third and fourth elongated electrode portions each include a tip portion in a pixel outer peripheral portion, the tip portion not being connected to any other conductive member.

In an embodiment, the first, second, third and fourth elongated electrode portions are commonly connected to a ring-shaped outer electrode portion selectively provided in the pixel outer peripheral portion.

In an embodiment, the first alignment axis azimuth is offset by a first angle clockwise with respect to the first direction, and the second alignment axis azimuth is offset by an angle that is the same as the first angle clockwise with respect to the second direction.

In an embodiment, the liquid crystal display device further includes a second alignment film provided in the second substrate, the second alignment film including a fifth alignment region facing the first alignment region of the first alignment film and a sixth alignment region facing the second alignment region of the first alignment film. An alignment axis azimuth in the fifth alignment region is parallel to the first alignment axis azimuth, and an alignment axis azimuth in the sixth alignment region is parallel to the second alignment axis azimuth.

In an embodiment, the first alignment region and the third alignment region align the liquid crystal molecules therein such that alignment azimuths thereof are different from each other by 180°, and the second alignment region and the fourth alignment region align the liquid crystal molecules therein such that alignment azimuths thereof are different from each other by 180°.

In an embodiment, the first alignment film is a photoalignment film.

In an embodiment, the liquid crystal display device further includes a backlight unit provided on the first polarizer on the side opposite to the liquid crystal layer. An absorption axis of the first polarizer and the first alignment axis azimuth are substantially parallel to each other, and a transmission axis of the first polarizer and the second alignment axis azimuth are substantially parallel to each other.

In an embodiment, the first substrate further includes an insulating layer located between the first electrode and the second electrode so as to cover either the first electrode and the second electrode. The liquid crystal molecules are rotated by an electric field generated between the first electrode and the second electrode that are electrically insulated by the insulating layer.

In an embodiment, the liquid crystal layer has a thickness d that is 2.15 μm or greater and 5.38 μm or less.

In an embodiment, the liquid crystal layer has a retardation d·Δn that is 280 nm or greater and 350 nm or less.

Advantageous Effects of Invention

In a liquid crystal display device in an embodiment according to the present invention, a color shift can be suppressed when the display is viewed in an oblique direction during white display and also in black display and display at a low gray scale level. Thus, viewing angle characteristics can be increased in any display state.

BRIEF DESCRIPTION OF DRAWINGS

FIG. 5(a) is a plan view showing a region corresponding to one pixel in the liquid crystal display device in Embodiment 1; and FIG. 5(b) is a cross-sectional view taken along line B-B' in FIG. 5(a).

FIGS. 8(a) and (b) respectively show alignment states of liquid crystal molecules in the liquid crystal display device in Embodiment 2 in the absence of, and in the presence of, an applied voltage; and FIG. 8(c) shows a light transmission state in the presence of an applied voltage.

FIGS. 10(a) and (b) respectively show alignment states of liquid crystal molecules in the liquid crystal display device in Embodiment 3 in the absence of, and in the presence of, an applied voltage; and FIG. 10(c) shows a light transmission state in the presence of an applied voltage.

FIG. 12 shows wavelength dependence of VT characteristics in a comparative example, wherein FIG. 12(a) shows a case when the display is viewed in the normal direction, and FIGS. 12(b) and (c) each show a case when the display is viewed in an oblique direction.

FIG. 13 shows wavelength dependence of VT characteristics in example 1, wherein FIG. 13(a) shows a case when the display is viewed in the normal direction, and FIGS. 13(b) and (c) each show a case when the display is viewed in an oblique direction.

FIG. 14 shows wavelength dependence of VT characteristics in example 2, wherein FIG. 14(a) shows a case when the display is viewed in the normal direction, and FIGS. 14(b) and (c) each show a case when the display is viewed in an oblique direction.

FIG. 15 shows wavelength dependence of VT characteristics in example 3, wherein FIG. 15(a) shows a case when the display is viewed in the normal direction, and FIGS. 15(b) and (c) each show a case when the display is viewed in an oblique direction.

FIG. 16 shows wavelength dependence of VT characteristics in the case where a liquid crystal material having a birefringence Δn=0.106 is used and the retardation is set to 300 nm, wherein FIG. 16(a) shows a case when the display is viewed in the normal direction, and FIGS. 16(b) and (c) each show a case when the display is viewed in an oblique direction.

FIG. 17 shows wavelength dependence of VT characteristics in the case where a liquid crystal material having a birefringence Δn=0.13 is used and the retardation is set to 300 nm, wherein FIG. 17(a) shows a case when the display is viewed in the normal direction, and FIGS. 17(b) and (c) each show a case when the display is viewed in an oblique direction.

FIG. 18 shows wavelength dependence of VT characteristics in the case where a liquid crystal material having a birefringence Δn=0.065 is used and the retardation is set to 300 nm, wherein FIG. 18(a) shows a case when the display is viewed in the normal direction, and FIGS. 18(b) and (c) each show a case when the display is viewed in an oblique direction.

FIG. 19 shows wavelength dependence of VT characteristics in the case where a liquid crystal material having a birefringence Δn=0.106 is used and the retardation is set to 330 nm, wherein FIG. 19(a) shows a case when the display is viewed in the normal direction, and FIGS. 19(b) and (c) each show a case when the display is viewed in an oblique direction.

FIG. 20 shows wavelength dependence of VT characteristics in the case where a liquid crystal material having a birefringence Δn=0.106 is used and the retardation is set to 350 nm, wherein FIG. 20(a) shows a case when the display is viewed in the normal direction, and FIGS. 20(b) and (c) each show a case when the display is viewed in an oblique direction.

FIG. 21 shows wavelength dependence of VT characteristics in the case where a liquid crystal material having a birefringence Δn=0.106 is used and the retardation is set to 280 nm, wherein FIG. 21(a) shows a case when the display is viewed in the normal direction, and FIGS. 21(b) and (c) each show a case when the display is viewed in an oblique direction.

DESCRIPTION OF EMBODIMENTS

Hereinafter, embodiments of a liquid crystal display device according to the present invention will be described with reference to the drawings. In the following description, the alignment directions of liquid crystal molecules need to be described accurately. Therefore, terms representing "alignment direction" are defined. In general, a "direction" is represented by a vector in a three-dimensional space, but there are cases where directions in a display plane (in a two-dimensional plane) or a positive direction and a negative direction (two directions different from each other by 180°) do not needed to be distinguished.

Figure 11:
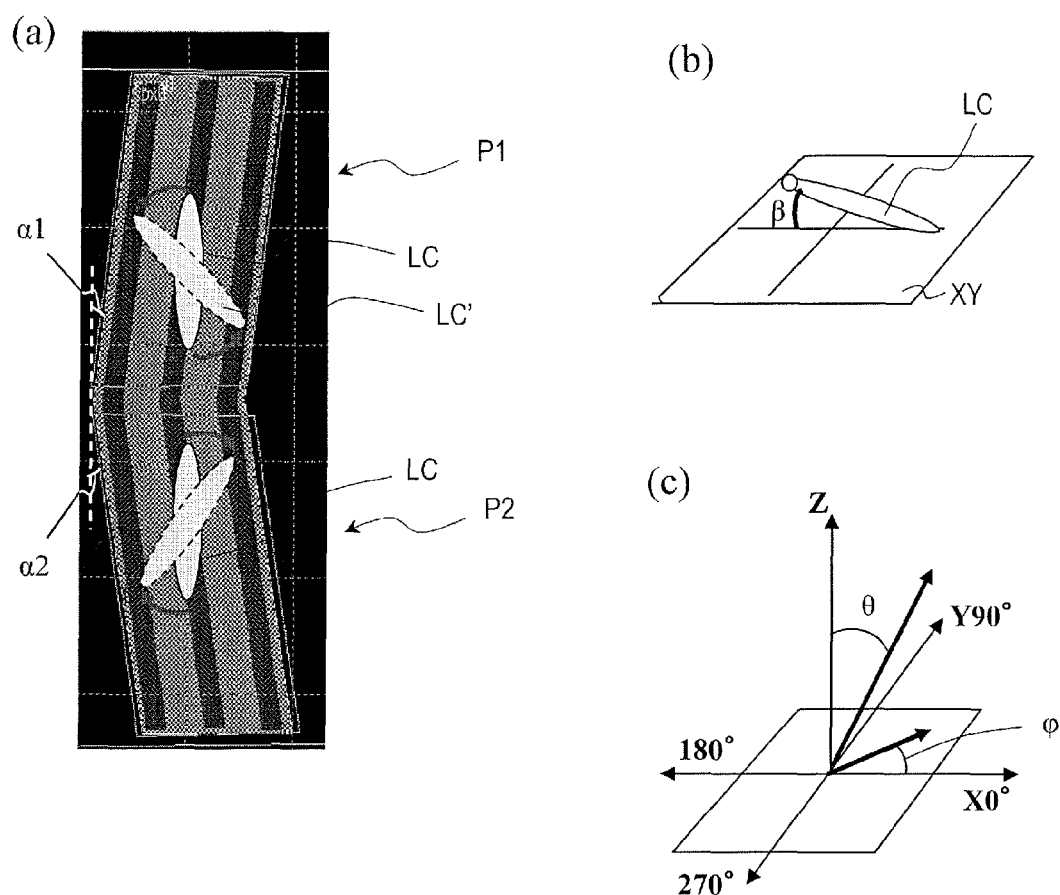
FIG. 11(a) shows a pixel structure of a liquid crystal display device in a comparative example.
FIG. 11(b) is an isometric view provided to explain a pretilt direction (pretilt azimuth and pretilt angle) of a liquid crystal molecule.
FIG. 11(c) is an isometric view provided to explain the polar angle θ and the azimuth angle φ defined with respect to a liquid crystal panel plane (substrate plane).

First, with reference to FIGS. 11(b) and (c), terms "alignment axis azimuth", "alignment azimuth" and "alignment direction" in this specification will be explained. As shown in FIG. 11(b), a liquid crystal molecule LC is typically aligned so as to have a predetermined pretilt angle β with respect to an principal face of an alignment film (XY plane). Now, a vector directed from an end of the liquid crystal molecules LC closer to the XY plane toward an end thereof farther from the XY plane (represented by a small white circle in FIG. 11(b)) is assumed. A direction represented by a component of the vector in the XY plane (projection on the XY plane) is referred to as the "alignment azimuth". The "alignment azimuth" can be represented in the range of 0 to 360° by use of azimuth angle φ shown in FIG. 11(c). A direction of a straight line defined by this "alignment azimuth" and an alignment azimuth different from the "alignment azimuth" by 180° (directed oppositely) is referred to as the "alignment axis azimuth". The expression "the alignment axis azimuth is the same" may indicate that the alignment azimuth is the same or the alignment azimuths are different from each other by 180°. The "alignment direction" means a three-dimensional direction (major axis direction of a liquid crystal molecule).

Hereinafter, embodiments of the present invention will be described. The present invention is not limited to the following embodiments.

The present inventor made various studies in an attempt to suppress a color shift in a liquid crystal display device of a lateral electric field mode, especially a color shift which may be caused when display is viewed in an oblique direction. As a result, it was found that a color shift can be effectively suppressed by the following structure. Four types of domains located in a 2×2 array in the horizontal direction and in the vertical direction are provided. In the absence of an applied voltage, the alignment axis azimuths of liquid crystal molecules are made substantially orthogonal to each other in the domains adjacent to each other in the horizontal direction and in the vertical direction; and when a voltage is applied, the liquid crystal molecules are rotated in the same direction in all the domains.

Figure 1:
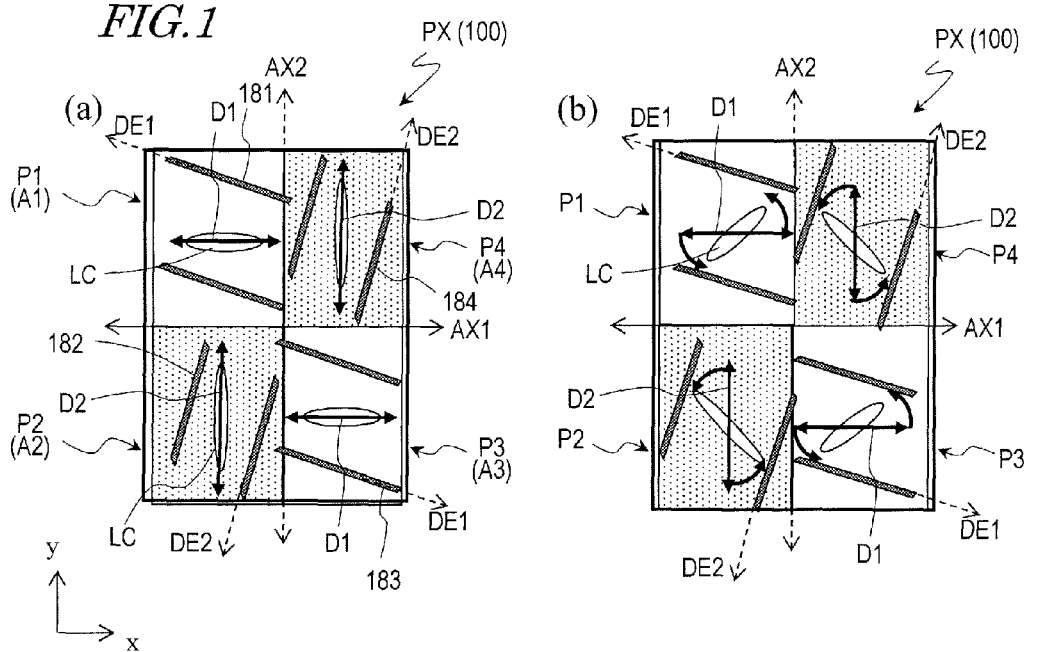
FIGS. 1(a) and (b) are each a plan view showing a region corresponding to one pixel in a liquid crystal display device in an embodiment according to the present invention.

FIGS. 1(a) and (b) each show a region corresponding to one pixel PX in a liquid crystal display device 100 of a lateral electric field mode in an embodiment according to the present invention. FIG. 1(a) shows a state in the absence of an applied voltage (black display), and FIG. 1(b) shows a state in the presence of a maximum voltage (white display).

The liquid crystal display device 100 includes a first domain P1, a second domain P2, a third domain P3 and a fourth domain P4 as four liquid crystal domains (corresponding to four sub pixel regions) in one pixel PX. The pixel includes a horizontal alignment film, in which four alignment regions A1 through A4 are defined in correspondence with the four domains P1 through P4. Initial alignment axis azimuths D1 and D2 of liquid crystal molecules LC in the domains P1 through P4 in the absence of an applied voltage are determined by an alignment regulating force of the alignment regions A1 through A4 respectively. Elongated electrode portions 181 through 184, which are parts of a pixel electrode, are provided in correspondence with the domains P1 through P4. In the domains P1 through P4, the elongated electrode portions 181 through 184 extend in a direction DE1 or DE2. The direction DE1 and DE2 have a predetermined angle (typically, 3 to 10°) with respect to the initial alignment axis azimuths D1 and D2 respectively.

As can be seen from FIG. 1(a), in two domains adjacent to each other in the horizontal direction and in the vertical direction (e.g., the first domain P1 and the second domain P2, or the first domain P1 and the fourth domain P4; hereinafter, occasionally referred to as "adjacent domains"), the initial alignment axis azimuths D1 and D2 are substantially orthogonal to each other. Similarly, the directions DE1 and DE2 in which the elongated electrode portions 181 through 184 extend are substantially orthogonal to each other. By contrast, in two domains located on a diagonal line in the pixel PX (the first domain P1 and the third domain P3, or the second domain P2 and the fourth domain P4; hereinafter, occasionally referred to as "diagonal domains"), the initial alignment axis azimuths D1 and D2 are the same as each other, and the directions DE1 and DE2 in which the elongated electrode portions extend are the same as each other.

When a voltage is applied to the pixel PX having such a structure, as shown in FIG. 1(b), the liquid crystal molecules LC are rotated in the same direction (in FIG. 1(b), counterclockwise) in all the domains by about the same angle. In this case, liquid crystal molecules are rotated while keeping the state where the alignment axis azimuths thereof are different from each other by about 90° (i.e., the state where the alignment axis azimuths are substantially orthogonal to each other) in two domains adjacent to each other in the horizontal direction and in the vertical direction. In diagonal domains, the liquid crystal molecules are rotated while keeping the state where the alignment axis azimuths thereof are parallel to each other. The angle of rotation varies in accordance with the level of the applied voltage, whereas the angle made by the alignment axis azimuths in adjacent domains is kept substantially the same regardless of the level of the applied voltage.

In adjacent domains among the four domains P1 through P4, the alignment axis azimuths of the liquid crystal molecules are substantially orthogonal to each other in any of a black display state, a gray scale display state and a white display state. Therefore, a color shift is suppressed when the viewing direction (azimuth) is changed in any of the display states. As a result, display having improved viewing angle characteristics in all the azimuths from the black display state to the white display state is realized.

Patent Document 3 describes that in a liquid crystal display device of a dual domain IPS mode, the initial alignment axis azimuths in adjacent domains are made different from each other by 90°. However, Patent Document 3 does not disclose forming four domains. It will be appreciated that Patent Document 3 does not describe keeping the state where the alignment axis azimuths are different from each other in domains adjacent to each other in the horizontal direction and in the vertical direction among four domains.

By contrast, the liquid crystal display device 100 in an embodiment according to the present invention operates in an FFS mode, and rotates the liquid crystal molecules in the same direction in the four domains while keeping the difference between the major axis directions of the liquid crystal molecules in adjacent domains at about 90° from the black display state to the white display state. Owing to this, coloring can be suppressed in any display state in any viewing direction. The liquid crystal display device in an embodiment according to the present invention can suppress a color shift appropriately in any display state regardless of whether a positive liquid crystal material is used or a negative liquid crystal material is used. In addition, the liquid crystal display device in an embodiment according to the present invention can increase the transmittance at a relatively low voltage.

In the liquid crystal display device described in Patent Document 3, the elongated electrodes extend parallel to the source bus lines or the gate bus lines. However, the initial alignment azimuths of the liquid crystal molecules and polarization axis directions of polarizing plates do not extend parallel to the source bus lines or the gate bus lines. In this structure, linearly polarized light incident on a liquid crystal layer through a polarization film may be possibly disturbed by the source bus lines or the like. This may possibly decrease the display quality.

By contrast, in an embodiment according to the present invention, the initial alignment azimuths of the liquid crystal molecules and polarization axis directions of polarizing plates are set to extend parallel to the source bus lines or the gate bus lines. Therefore, linearly polarized light from the polarizing plate can be preferably usable for display.

Hereinafter, the present invention will be described more specifically by way of Embodiments 1 through 3 with reference to the drawings.

Embodiment 1

Figure 2:
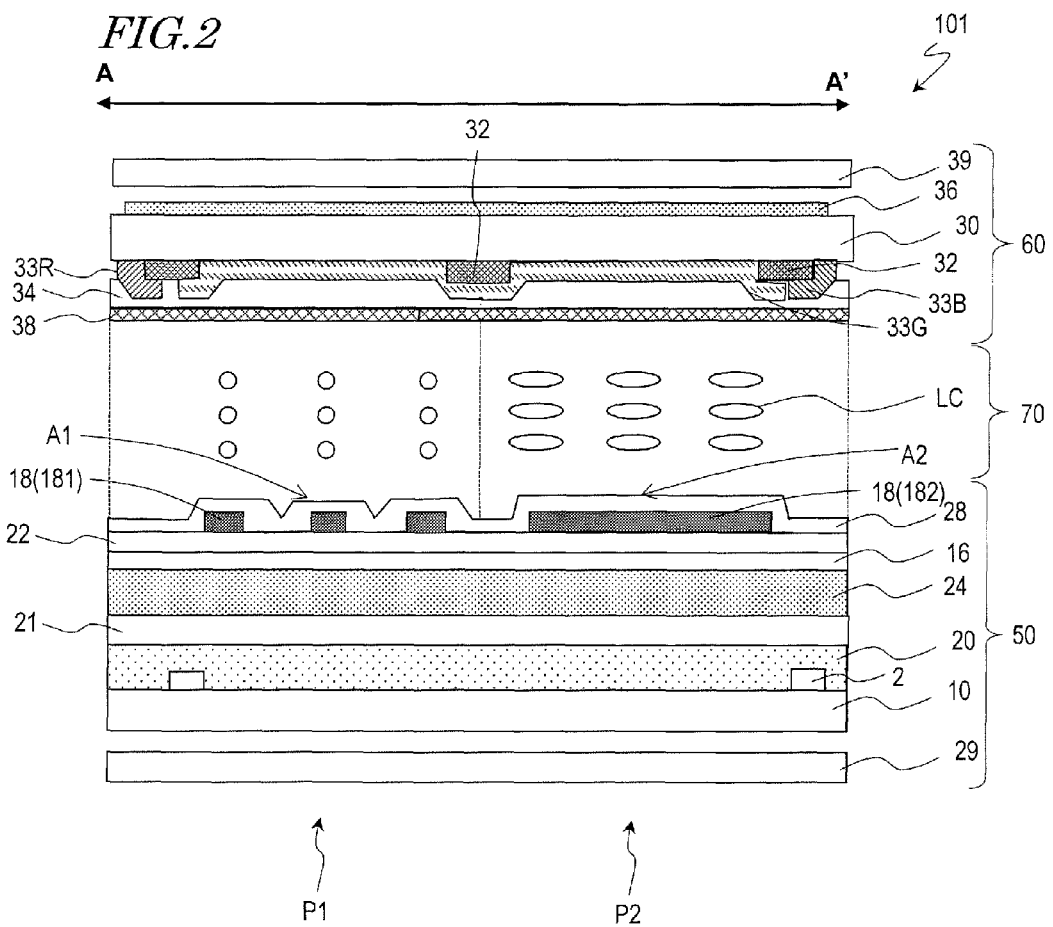
FIG. 2 is a cross-sectional view of a liquid crystal display device in Embodiment 1 according to the present invention, taken along line A-A' in FIG. 3.
Figure 3:
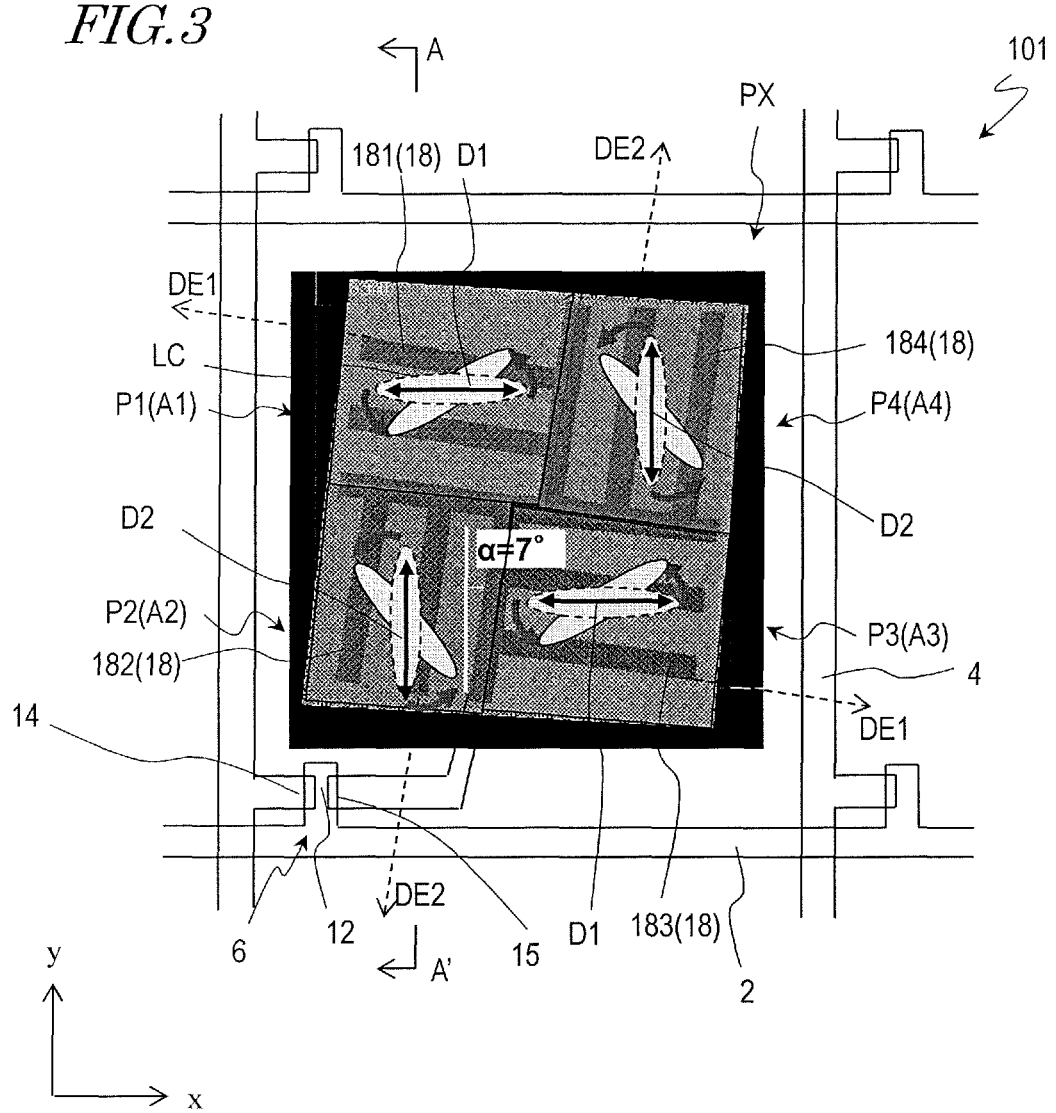
FIG. 3 is a plan view showing a region corresponding to one pixel in the liquid crystal display device in Embodiment 1.

FIG. 2 and FIG. 3 each show a region corresponding to one pixel of a direct-viewing type liquid crystal display device 101 of a lateral electric field mode in Embodiment 1 according to the present invention. FIG. 2 is a cross-sectional view taken along line in FIG. 3.

As shown in FIG. 2, the liquid crystal display device 101 in this embodiment includes a TFT substrate 50 and a counter substrate 60 located to face each other, and a liquid crystal layer 70 interposed therebetween. The liquid crystal layer 70 contains a nematic liquid crystal material having positive dielectric anisotropy (which, hereinafter, will be occasionally referred to as a positive liquid crystal material). The liquid crystal display device 101 in this embodiment operates in an FFS mode, such that display is conducted by liquid crystal molecules LC aligned horizontally undergoing a rotational motion within a substrate plane in accordance with the direction and magnitude of an applied electric field.

In the TFT substrate 50 and the counter substrate 60, a rear-side polarizing plate 29 and a front-side polarizing plate 39 are respectively provided on the side opposite to the liquid crystal layer 70. In the liquid crystal display device 101, an absorption axis of the rear-side polarizing plate 29 and an absorption axis of the front-side polarizing plate 39 (or, alternatively, transmission axes thereof) are in crossed Nicols, namely, orthogonal to each other, and thus the liquid crystal display device 101 operates in a normally black mode.

A backlight unit (not shown) which includes an LED, a cold cathode-ray tube or the like is provided outer to the rear-side polarizing plate 29 (i.e., on the side opposite to the liquid crystal layer 70). Display is conducted by allowing light from the backlight unit to be modulated by the liquid crystal layer 70 and output from the counter substrate 60 toward a viewer.

As shown in FIG. 2 and FIG. 3, the TFT substrate 50 includes a transparent substrate 10 of glass or the like. On the transparent substrate 10 are provided: gate bus lines 2, source bus lines 4, and TFTs 6 located near intersections thereof. Each TFT 6 includes a gate electrode 12 connected to a gate bus line 2, a source electrode 14 connected to a source bus line 4, a drain electrode 15 located to face the source electrode 14 with an interspace interposed therebetween, and a semiconductor layer (not shown), which is typically in an island shape and is connected to the source electrode 14 and the drain electrode 15 above the gate electrode 12.

The gate electrode 12 is electrically insulated from the source electrode 14 and the drain electrode 15 by an intervening gate insulating film 20. When an ON voltage is applied to the gate electrode 12, conduction between the source electrode 14 and the drain electrode 15 occurs via the semiconductor layer (channel). The semiconductor layer is formed of, for example, amorphous silicon or an oxide semiconductor such as In—Ga—Zn—O-based semiconductor (oxide containing indium, gallium and zinc) or the like.

The TFT 6 and the source bus line 4 are entirely covered with a first protection film (insulating film) 21. On the first protection film 21, an organic interlayer insulating film 24 is provided to planarize the surface and prevent any unwanted capacitance from being created.

In this embodiment, a pixel PX is defined in a region surrounded by two adjacent gate bus lines 2 and two adjacent source bus lines 4. The gate bus lines 2 extend linearly along an x axis direction shown in FIG. 3, whereas the source bus lines 4 extend linearly along a y axis direction shown in FIG. 3. Although one pixel is shown in the figures, a plurality of pixels PX are actually located in a matrix along the x and y axis directions.

In each pixel PX, a common electrode 16 formed across the entire pixel PX and a pixel electrode 18 formed above the common electrode 16 with a second protection film (insulating film) 22 interposed between are provided on the organic interlayer insulating film 24. A photoalignment film 28 which is in contact with the liquid crystal layer 70 is provided on the pixel electrode 18, so that the alignment directions of the liquid crystal molecules LC in the absence of an applied voltage are regulated by the photoalignment film 28.

In this embodiment, each pixel PX includes a first sub pixel region (first domain) P1 and a second sub pixel region (second domain) P2 which are adjacent to each other in an up-down direction (y axis direction) in FIG. 3. A fourth sub pixel region (fourth domain) P4 and a third sub pixel region (third domain) P3 are provided to be respectively adjacent in a left-right direction (x axis direction) to the sub pixel regions P1 and P2. The third sub pixel region P3 and the fourth sub pixel region P4 are adjacent to each other in the up-down direction. Namely, the first sub pixel region P1, the second sub pixel region P2, the third sub pixel region P3 and the fourth sub pixel region P4 are located counterclockwise in this order from the left top position.

The photoalignment film 28 includes first through fourth alignment regions A1 through A4 in correspondence with the first through fourth sub pixel regions P1 through P4. The photoalignment film 28 mainly functions as a horizontal alignment film that determines the alignment azimuths of the liquid crystal molecules. A pretilt angle of the liquid crystal molecules regulated by the photoalignment film 28 is typically set to 1° or less. It is preferable that the photoalignment film 28 functions to regulate the pretilt angle of the liquid crystal molecules to 0.1° or greater and 1.0° or less.

In the first alignment region A1 of the photoalignment film 28, the liquid crystal molecules LC are aligned in the first alignment axis azimuth D1, and in the second alignment region A2, the liquid crystal molecules LC are aligned in the second alignment axis azimuth D2. In the third alignment region A3, the liquid crystal molecules LC are aligned in the first alignment axis azimuth D1 (i.e., the same alignment axis azimuth as that in the first alignment region A1), and in the fourth alignment region A4, the liquid crystal molecules LC are aligned in the second alignment axis azimuth D2 (i.e., the same alignment axis azimuth as that in the second alignment region A2). However, as described later, rising directions of the liquid crystal molecules LC are different from each other in the first alignment region A1 and the third alignment region A3, and the alignment azimuths are different from each other by 180°. This relationship is occasionally referred to as "antiparallel".

In this embodiment, the first alignment axis azimuth D1 is a direction substantially parallel to the x axis, whereas the second alignment axis azimuth D2 is a direction substantially parallel to the y axis. The first alignment axis azimuth D1 and the second alignment axis azimuth D2 are substantially orthogonal to each other. A transmission axis AX1 and an absorption axis AX2 (see FIG. 1) of the rear-side polarizing plate 29 are set to be substantially parallel to the first alignment axis azimuth D1 and the second alignment axis azimuth D2, respectively.

Now, the first alignment axis azimuth D1 and the second alignment axis azimuth D2 will be described. The pretilt angle and the initial alignment azimuth of the liquid crystal molecules LC in the absence of an applied voltage are determined by an alignment regulating force of the photoalignment film 28. As shown in FIG. 11(b), the pretilt angle (β) is an angle (rising angle) made by the principal face of the alignment film (XY plane) and the major axis direction of the liquid crystal molecule LC. The initial alignment azimuth is an azimuth represented by an azimuth angle φ (0 to 360°) defined counterclockwise from 0°, which corresponds to the rightward direction of the horizontal direction (positive direction of the x axis) (see FIG. 11(c)). In the first sub pixel region P1 and the third sub pixel region P3, the alignment azimuth of the liquid crystal molecules LC may be either 0° or 180°, whereas in both of the regions P1 and P3, the liquid crystal molecules LC are aligned in the first alignment axis azimuth D1. Similarly, in the second sub pixel region P2 and the fourth sub pixel region P4, the alignment azimuth of the liquid crystal molecules LC may be either 90° or 270°, whereas in both of the regions P2 and P4, the liquid crystal molecules LC are aligned in the second alignment axis azimuth D2.

In this embodiment, in the first sub pixel region P1, the initial alignment azimuth of the liquid crystal molecules is set to 0°, and in the third sub pixel region P3, the initial alignment azimuth of the liquid crystal molecules is set to 180°. Namely, in the first sub pixel region P1 and the third sub pixel region P3, the initial alignment azimuths of the liquid crystal molecules have an antiparallel relationship. Similarly, in the second sub pixel region P2 and the fourth sub pixel region P4, the initial alignment azimuths of the liquid crystal molecules are respectively 90° and 270° and have an antiparallel relationship.

In this specification, a "photoalignment film" means an alignment film to which an alignment regulating force is given through irradiation of light (e.g., polarized ultraviolet). Patent Document 4 describes a liquid crystal display device including a photoalignment film. Patent Document 4 describes a technique of forming a photoalignment film by, for example, irradiating, with light, an alignment film which is formed of a polymer having a polyimide main chain and a side chain containing a cinnamate group as a photoreactive functional group. The entirety of Patent Document 4 is incorporated therein by reference.

Now, a structure of the pixel electrode 18 provided in the pixel PX will be described.

The pixel electrode 18 includes a plurality of elongated electrode portions 181 through 184 provided in correspondence with the first through fourth sub pixel regions P1 through P4 respectively. In the first sub pixel region P1, the plurality of elongated electrode portions 181 parallel to each other are provided. In the second sub pixel region P2, the plurality of elongated electrode portions 182 parallel to each other are provided. In the third sub pixel region P3, the plurality of elongated electrode portions 183 parallel to each other are provided. In the fourth sub pixel region P4, the plurality of elongated electrode portions 184 parallel to each other are provided. The elongated electrode portions 181 through 184 are electrically connected to each other at boundaries between the domains, and have the same potential in the presence of an applied voltage.

In this embodiment, the direction in which the elongated electrode portions 181 in the first sub pixel region P1 extend and the direction in which the elongated electrode portions 183 in the third sub pixel region P3 extend are substantially parallel to each other (first electrode direction DE1). The direction in which the elongated electrode portions 182 in the second sub pixel region P2 extend and the direction in which the elongated electrode portions 184 in the fourth sub pixel region P4 extend are substantially parallel to each other (second electrode direction DE2). The first electrode direction DE1 and the second electrode direction DE2 are substantially orthogonal to each other.

The first electrode direction DE1 is inclined by 7° clockwise with respect to the first alignment axis azimuth D1, and the second electrode direction DE2 is inclined by 7° clockwise with respect to the second alignment axis azimuth D2. In this embodiment, the first electrode direction DE1 and the second electrode direction DE2 are also respectively inclined by 7° clockwise with respect to the direction in which the gate bus lines 2 extend (x axis direction) and the direction in which the source bus lines 4 extend (y axis direction). The angle made by the electrode direction DE1, DE2 and the alignment axis azimuth D1, D2 (pixel electrode angle α) is preferably set to greater than 0° and 10° or less, and more preferably set to 3° or greater and 10° or less.

As shown in FIG. 3, in an outer peripheral portion of the pixel PX, tip portions of the elongated electrode portions 181 through 184 are not connected to any other conductive member, and the entirety of the pixel electrode 18 have a shape close to "田". In each of the sub pixel regions P1 through P4, the electrode is comb-shaped. Namely, the pixel electrode 18 has a plurality of elongated cut-off portions extending from edges of the pixel. In this specification, such a cut-off portion will be occasionally referred to as a "slit". Namely, in this specification, the term "slit" encompasses an elongated opening and also an elongated cut-off portion.

A comb-shaped electrode in which the tip portions of the elongated electrode portions are not connected to any other electrode portion as in this embodiment is advantageous to increase the numerical aperture of the pixel. A reason for this is that the tip portions of the elongated electrode portions can extend to peripheral edges of the pixel, and thus an electric field of a desired direction can be easily generated also at the peripheral edges of the pixel.

The pixel electrode 18 formed to include the plurality of electrode portions 181 through 184 as described above is electrically connected to the drain electrode 15 of the TFT 6 in a contact hole 19 (see FIGS. 5(a) and (b)). A signal voltage from the source bus line 4 is applied to the pixel electrode 18 during an ON period of the TFT 6, whereas a common voltage is applied to the common electrode 16 independently from the pixel electrode 18 because of a predetermined circuit configuration. The common electrode 16 may be formed to have a shape corresponding to that of each pixel PX or may be provided commonly for the plurality of pixels. It will be appreciated that the common electrode 16 is insulated from the pixel electrode 18 and the TFT 6. Referring to FIGS. 5(a) and (b), the common electrode 16 can be insulated from the pixel electrode 18 or the like by, for example, forming a cut-off portion in the common electrode 16 in the vicinity of the contact hole 19 and providing an insulating film 25 between the common electrode 16 and the pixel electrode 18.

The common electrode 16 and the pixel electrode 18 are formed of a transparent conductive material such as ITO or the like, and can transmit light from the backlight unit (not shown). In a portion where the common electrode 16 and the pixel electrode 18 face each other with the second protection film 22 interposed therebetween, a storage capacitor (auxiliary capacitor) Cs which is in parallel electrical connection with a liquid crystal capacitor Clc is created. The storage capacitor Cs appropriately retains the voltage to be applied across the liquid crystal layer 70 during an OFF period of the TFT 6.

In the TFT substrate 50 having such a structure, when different voltages are applied to the pixel electrode 18 and to the common electrode 16, electric fields are generated in different directions in the first and third domains P1 and P3 from in the second and fourth domains P2 and P4. In the first and third domains P1 and P3, an electric field having an in-plane component in a direction substantially orthogonal to the first electrode direction DE1 is generated, whereas in the second and fourth domains P2 and P4, an electric field having an in-plane component in a direction substantially orthogonal to the second electrode direction DE2 is generated. At this point, the liquid crystal molecules having positive dielectric anisotropy are rotated within the plane such that the major axis direction thereof is aligned to the direction of the generated electric field (i.e., such that the minor axis direction thereof is aligned to a direction orthogonal to the generated electric field). Therefore, as shown in FIG. 3, the liquid crystal molecules LC are rotated counterclockwise in all the domains.

Hereinafter, an alignment state of the liquid crystal molecules in each domain will be described more specifically.

Figure 4:
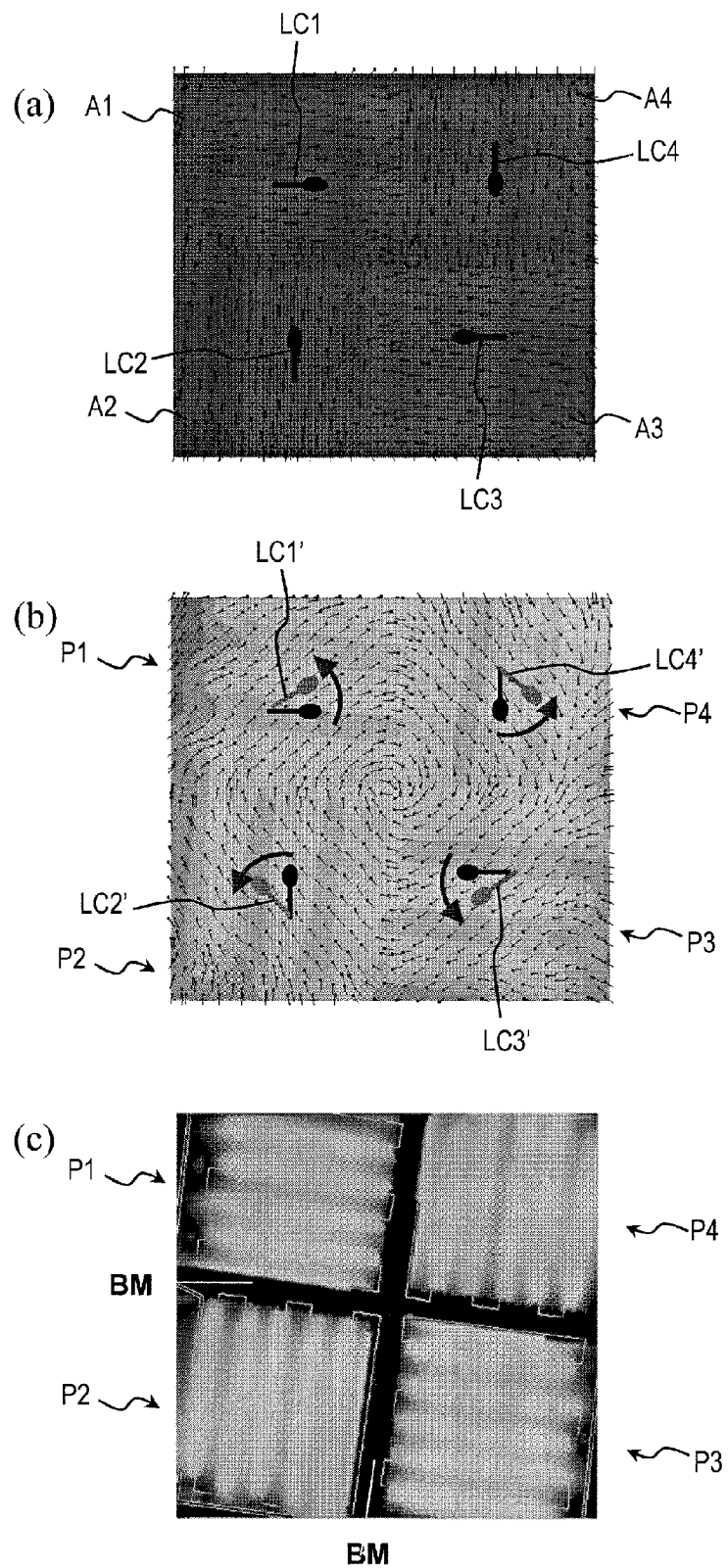
FIGS. 4(a) and (b) respectively show alignment states of liquid crystal molecules in the liquid crystal display device in Embodiment 1 in the absence of, and in the presence of, an applied voltage.
FIG. 4(c) shows a light transmission state in the presence of an applied voltage.

FIGS. 4(a) and (b) respectively show alignment states of the liquid crystal molecules in the absence of, and in the presence of, an applied voltage. In the absence of an applied voltage, the liquid crystal molecules are set to be aligned as shown in FIG. 4(a) in the regions corresponding to the alignment regions A1 through A4. In FIG. 4(a), matchstick shapes represent liquid crystal molecules LC1 through LC4, and the alignment azimuth of each of the liquid crystal molecules LC1 through LC4 is represented by the head of the corresponding matchstick shape.

As can be seen from FIGS. 4(a) and (b), when a voltage is applied, the liquid crystal molecules in adjacent domains are rotated in the same direction while keeping the state of making an angle of about 90° with each other. As a result, among the post-rotation liquid crystal molecules LC1' through LC4', the liquid crystal molecules in adjacent domains have alignment azimuths making an angle of about 90° with each other. FIG. 4(c) shows a light transmission state in the alignment state shown in FIG. 4(b). A paler colored area transmits more light, and a darker colored area transmits less light. FIG. 4(c) also shows a light-blocking portion (black matrix BM) provided in the counter substrate 60 described later.

As described above, the pixel is structured such that the alignment axis azimuths are different from each other by 90° in adjacent domains among the first through fourth domains P1 through P4 and are parallel to each other in diagonal domains among the first through fourth domains P1 through P4. With such a structure, the liquid crystal molecules in the four domains are smoothly rotated easily when a voltage is applied. This can increase the response speed.

It is preferable as shown in FIG. 4(a) that the initial alignment azimuth of the liquid crystal molecules is set to 0° in the first domain P1, to 90° in the second domain P2, to 180° in the third domain P3 and to 270° in the fourth domain P4. A reason for this is that with such a setting, the liquid crystal molecules at the boundaries between adjacent domains are easily aligned when a voltage is applied such that the liquid crystal molecules in the corresponding domains are rotated smoothly.

With reference to FIG. 2 again, the counter substrate 60 will be described. As shown in FIG. 2, the counter substrate 60 includes a transparent substrate 30 of glass or the like, a black matrix 32 provided on the transparent substrate 30, and red, green and blue color filters 33R, 33G and 33B to support full-color display. On the liquid crystal layer 70 side of the transparent substrate 30, an photoalignment film 38 is provided with an organic planarization film 34 interposed therebetween. The photoalignment film 38 is in contact with the liquid crystal layer 70. A transparent conductive film 36 of ITO or the like for preventing electrostatic charge is provided outer to the transparent substrate 30 (i.e., on the side opposite to the liquid crystal layer 70).

In this embodiment, the photoalignment film 38 provided on the transparent substrate 30 includes first through fourth alignment region A1 through A4 in correspondence with the first through fourth sub pixel regions P1 through P4 respectively, like the photoalignment film 28 provided in the TFT substrate 50. The alignment axis azimuths in these alignment regions A1 through A4 are set to be substantially the same as those in the photoalignment film 28 included in the TFT substrate 50. Namely, the alignment regions A1 through A4 of the photoalignment film 28 included in the TFT substrate 50 and the alignment regions A1 through A4 of the photoalignment film 38 included in the counter substrate 60 overlap each other as seen in the direction normal to the substrates. The alignment axis azimuth is the same in each of a pair of alignment regions A1, a pair of alignment regions A2, a pair of alignment regions A3 and a pair of alignment regions A4. Each such pair of alignment regions face each other with the liquid crystal layer 70 interposed therebetween. Alignment directions (alignment azimuths), in which the pretilt angle is taken into account, of the alignment films 28 and 38 facing each other are preferably in an antiparallel relationship, namely, are different from each other by 180°.

In the liquid crystal display device 101 having the above-described structure, light incident on the liquid crystal layer 70 through the rear-side polarizing plate 29 is modulated to provide display. At this point, as in the state shown in FIG. 1, in the first and third domains P1 and P3, the absorption axis AX1 of the rear-side polarizing plate 29 and the alignment axis azimuth D1 of the liquid crystal molecules LC are substantially parallel to each other. Therefore, in the domains P1 and P3, a mode is realized in which a polarization direction of the incident linearly polarized light and the minor axis direction of the liquid crystal molecules LC are substantially parallel to each other. By contrast, in the second and fourth domains P2 and P4, the transmission axis AX2 of the rear-side polarizing plate 29 and the alignment axis azimuth D2 of the liquid crystal molecules LC (in the absence of an applied voltage) are substantially parallel to each other. Therefore, in the domains P2 and P4, a mode is realized in which a polarization direction of the incident linearly polarized light and the major axis direction of the liquid crystal molecules LC are substantially parallel to each other. Namely, in the liquid crystal display device 101 in this embodiment, a mode is realized in which the polarization direction of the incident light with respect to the major axis direction of the liquid crystal molecules in the absence of an applied voltage in the first and third domains P1 and P3 is different from that in the second and fourth domains P2 and P4.

It is preferable that in the domains P1 through P4, the angle of the first alignment axis azimuth D1 with respect to the first electrode direction DE1 (electrode angle α) is substantially equal in a predetermined rotation direction to the angle of the second alignment axis azimuth D2 with respect to the second electrode direction DE2. The electrode angle α is considered to be relevant to the rotation direction of the liquid crystal molecules when a voltage is applied, the angle of rotation, or the range of angles in which the liquid crystal molecules can be rotated. In the case where the electrode angle α is set to be equal in all the domains P1 through P4 (in this embodiment, the electrode angle α is 7° clockwise in all the domains), the liquid crystal molecules LC can be easily rotated in all the domains P1 through P4 while keeping the relationship among the initial alignment axis azimuths when an optional level of voltage is applied.

Note that Japanese Patent Application No. 2011-266284 filed by the present applicant describes a liquid crystal display device of a lateral electric field mode which provides black display when a low voltage of, for example, about 0.3 V to 1 V is applied, rather than in the absence of an applied voltage (or when 0 V is applied). In this liquid crystal display device, the alignment axis azimuth of the liquid crystal molecules is offset by, for example, 1° to 2° with respect to the polarization axis in the direction opposite to the rotation direction of the liquid crystal molecules. With such a structure, when the liquid crystal display device is operated by, for example, a gate inversion driving method, a low power consumption and a high contrast ratio can be both realized by providing black display in the presence of a low applied voltage. Such a technique is also applicable to embodiments of the present invention. Therefore, the alignment azimuth D1, D2 in each domain and the polarization axis (transmission axis AX1, absorption axis AX2) may be offset by about, for example, 1° or less.

At the boundaries between the domains P1 through P4, the alignment state may be different from that in the other regions. Therefore, light leakage may be undesirably observed when display is provided at a low gray scale level. In order to avoid this, it is preferable that a region corresponding to the boundaries between the domains is shielded against light. In this embodiment, a BM (black resin or metal film) of a predetermined width is provided in the counter substrate (color filter substrate) in correspondence with the boundaries between the domains. Thus, the region is shielded against light. The light blocking method is not limited to the above-described method. For example, a metal line for connecting a plurality of common electrodes formed in correspondence with the plurality of pixels may be formed along the boundaries between the domains.

Alternatively, the source bus line 4 and the gate bus line 2 may be provided so as to overlap the boundaries between the four domains P1 through P4 in one pixel. In this case, unlike the structure shown in FIG. 3, the TFT 6 and the contact hole (not shown) for connecting the source bus line 4 and the pixel electrode 18 to each other may be provided in a central area of the four domains (i.e., in a central area of the pixel). The central area of the pixel is an area where a desired alignment state cannot be provided easily and is typically shielded against light by the black matrix BM. Therefore, in the case where the gate bus line 2, the source bus line 4 and the TFT 6 are provided in this area, the width of the non-display area caused between adjacent pixels can be designed to be narrower, which can increase the numerical aperture of the pixels.

In the above-described structure, as shown in FIGS. 5(a) and (b), the pixel electrode 18 including the plurality of elongated electrode portions is provided as an uppermost layer of the TFT substrate 50 (but below the photoalignment film (not shown)). Any other structure may be adopted. In FIGS. 5(a) and (b), the elongated electrode portions extend parallel to the gate bus lines 2 and the source bus lines 4. In this case, the alignment axis azimuths in the alignment film and the direction of the polarization axes of the polarizing plates may be set to be slightly (e.g., by 3° to 10°) inclined with respect to the directions in which the elongated electrode portions extend.

Figure 6:
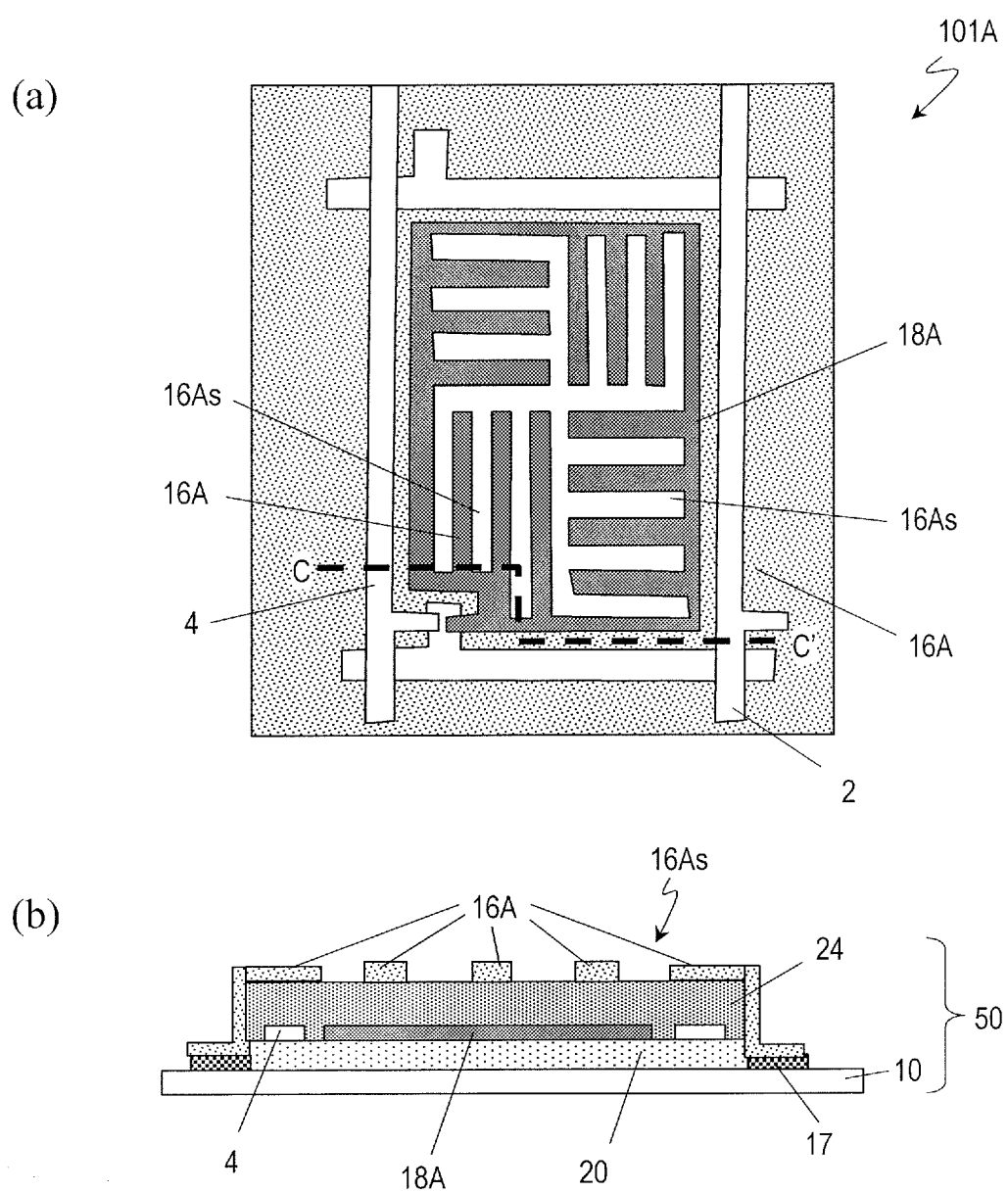
FIG. 6(a) is a plan view showing a region corresponding to one pixel in a liquid crystal display device in a modification of Embodiment 1.
FIG. 6(b) is a cross-sectional view taken along line C-C' in FIG. 6(a).

FIGS. 6(a) and (b) show a liquid crystal display device 101A in a modification. As can be seen from the figures, in the liquid crystal display device 101A in the modification, a common electrode 16A is provided as an uppermost layer of the TFT substrate 50. The common electrode 16A includes an opening 16As having substantially the same shape as that of the pixel electrode 18 shown in FIGS. 5(a) and (b). The opening 16As includes a plurality of elongated slits extending parallel to each other. The elongated electrode portions are held between adjacent elongated slits. The common electrode 16A is connected to a common bus line 17 provided in a peripheral portion of the pixel. The common bus line 17 may be commonly provided for a plurality of pixels. The potential of the common electrode 16 is controlled via the common bus line 17.

In the liquid crystal display device 101A in the modification, a pixel electrode 18A is provided in the same layer as the source bus line 4 and is formed as the drain electrode 15 (or an extended portion of the drain electrode). The pixel electrode 18A has a shape corresponding to the entire pixel.

In the structure in which the common electrode 16A that is not electrically connected to the TFT 6 is provided above the pixel electrode 18A as described above, it is not necessary to connect the drain electrode 15 and the pixel electrode 18 to each other in the contact hole 19 in the cut-off portion of the common electrode 16, unlike in FIGS. 5(a) and (b). Therefore, the liquid crystal display device 101A in the modification does not need to include the contact hole 19, and thus can increase the area of the pixel usable for display. This can increase the numerical aperture.

Embodiment 2

Hereinafter, a liquid crystal display device 102 in Embodiment 2 according to the present invention will be described.

Figure 7:
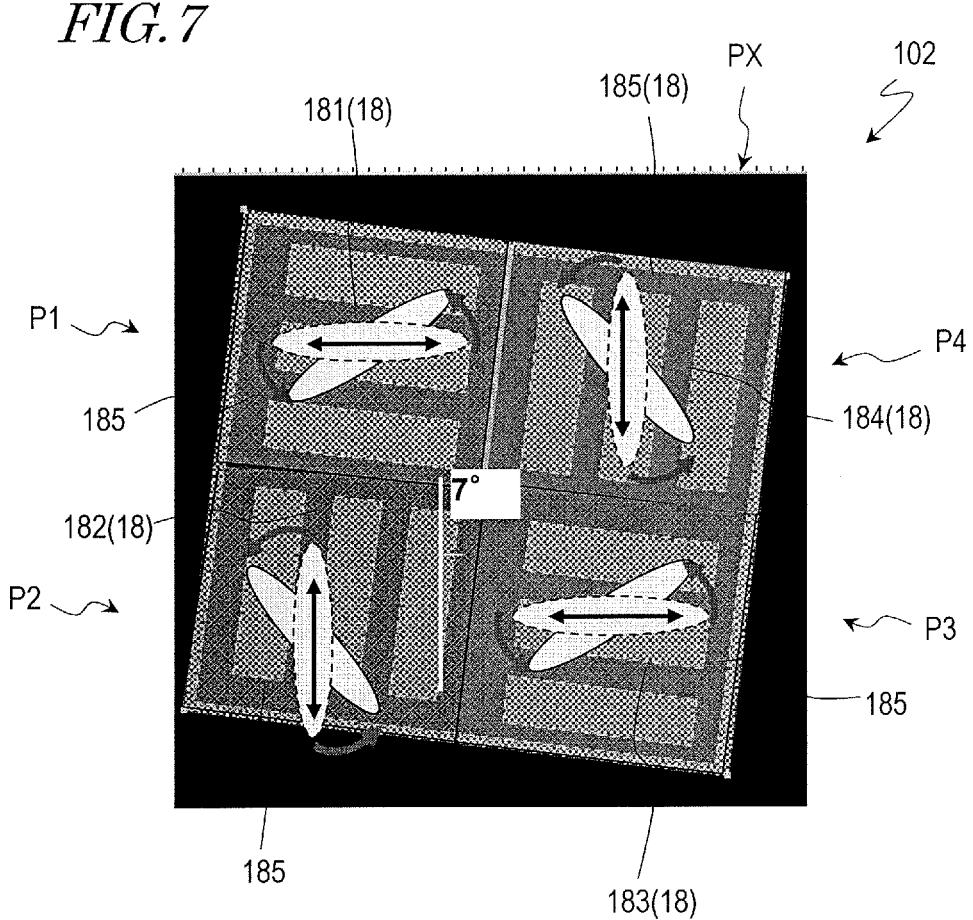
FIG. 7 is a plan view showing a region corresponding to one pixel in a liquid crystal display device in Embodiment 2.

FIG. 7 shows a region corresponding to one pixel of the liquid crystal display device 102 in Embodiment 2. The liquid crystal display device 102 in Embodiment 2 has substantially the same structure as that of the liquid crystal display device 101 in Embodiment 1 shown in FIG. 3 except for the shape of the pixel electrode 18. In Embodiment 1, the tip portions of the elongated electrode portions 181 through 184 are not connected to any other conductive member at the edges of the pixel. In Embodiment 2, the elongated electrode portions 181 through 184 are connected to a ring-shaped outer electrode portion 185 at the edges of the pixel.

The pixel electrode 18 in Embodiment 2 has slits as pixel electrode openings in each of the domains P1 through P4. These slits are openings interposed between adjacent elongated electrode portions 181 through 184. The slits extend in the same direction as the electrode directions DE1 and DE2 described in Embodiment 1. More specifically, in the first and third domains P1 and P3, the slits extend parallel to the first electrode direction DE1, whereas in the second and fourth domains P2 and P4, the slits extend parallel to the second electrode direction DE2.

Such a shape of electrode is suitable to a structure shown in FIGS. 6(a) and (b), in which the common electrode 16A is provided in a layer upper to the pixel electrode 18A. In the case where the common electrode 16A has a shape including the outer electrode portion 185 shown in FIG. 7, the common electrodes 16A respectively provided for the plurality of pixels can be easily connected to each other at the outer electrode portions 185 via the common bus line 17 or the like.

FIGS. 8(a) and (b) respectively show alignment states of the liquid crystal molecules in the absence of, and in the presence of, an applied voltage. In the absence of an applied voltage, the liquid crystal molecules LC are set to be aligned as shown in FIG. 8(a) in the regions corresponding to the alignment regions A1 through A4.

As can be seen from FIGS. 8(a) and (b), when a voltage is applied, the liquid crystal molecules LC in adjacent domains are rotated in the same direction while keeping the state of making an angle of about 90° with each other. As a result, among the post-rotation liquid crystal molecules LC', the liquid crystal molecules LC' in adjacent domains have alignment azimuths making an angle of about 90° with each other. FIG. 8(c) shows a light transmission state in the alignment state shown in FIG. 8(b). A paler colored area transmits more light, and a darker colored area transmits less light. FIG. 8(c) also shows a light-blocking portion (black matrix BM) provided in the counter substrate 60 described later.

In this embodiment also, the initial alignment axis azimuth in the first domain P1 is set to be the same as the initial alignment axis azimuth D1 in the third domain P3, but the initial alignment azimuth in the first domain P1 is set to be different by 180° from that in the third domain P3. The initial alignment axis azimuth in the second domain P2 is set to be the same as the initial alignment axis azimuth D2 in the fourth domain P4, but the initial alignment azimuth in the second domain P2 is set to be different by 180° from that in the fourth domain P4. Such an alignment allows the liquid crystal molecules in the domains P1 through P4 to be rotated more smoothly.

Embodiment 3

Hereinafter, a liquid crystal display device 103 in Embodiment 3 according to the present invention will be described.

Figure 9:
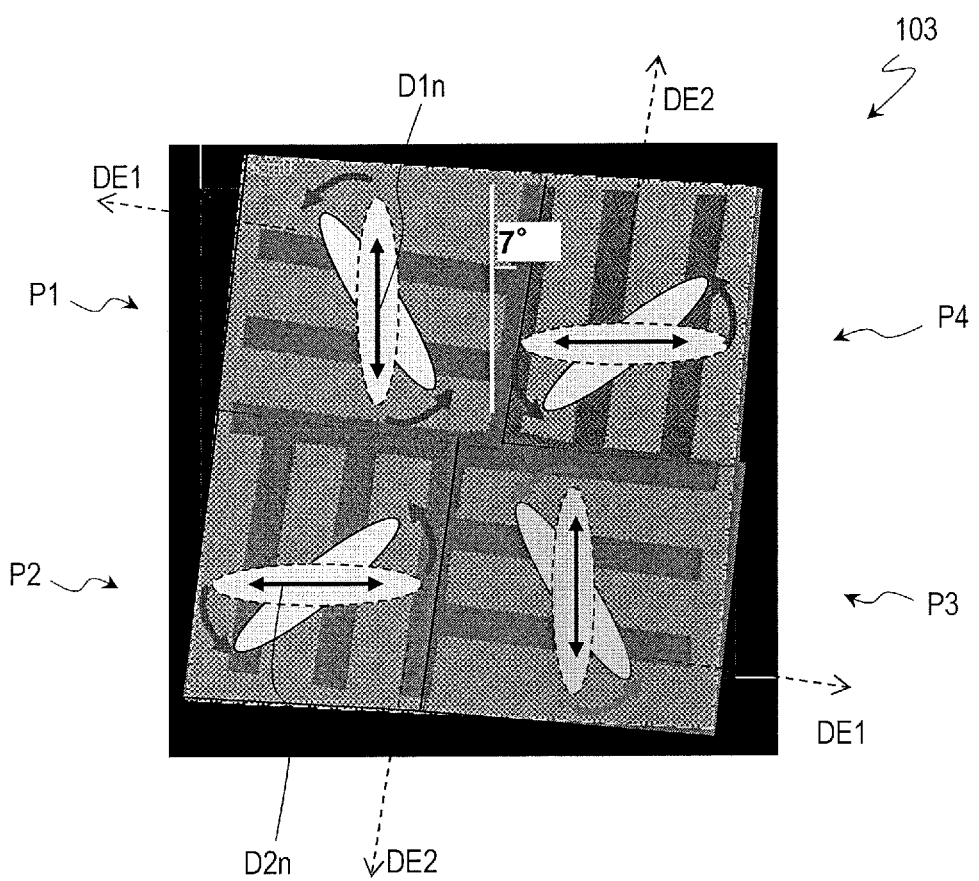
FIG. 9 is a plan view showing a region corresponding to one pixel in a liquid crystal display device in Embodiment 3.

In Embodiment 3, unlike in the liquid crystal display device 101 Embodiment 1, a negative liquid crystal material is used. As shown in FIG. 9, in the case where a negative liquid crystal material is used, first and second alignment axis azimuths D1$n$ and D2$n$ in the domains P1 through P4 (i.e., the alignment axis azimuths in the alignment regions A1 through A4 of the photoalignment film 28) are different from the alignment axis azimuths D1 and D2 in Embodiment 1. More specifically, in this embodiment, the first alignment axis azimuth D$in$ is substantially orthogonal to the first alignment axis azimuth D1 in Embodiment 1, and the second alignment axis azimuth D2$n$ is substantially orthogonal to the second alignment axis azimuth D2 in Embodiment 1.

In the liquid crystal display device 103 in this embodiment, when a voltage is applied, a liquid crystal molecule LC is rotated such that the minor axis direction thereof (direction orthogonal to the major axis direction) is parallel to the direction of the electric field. Therefore, in the domains P1 through P4, the initial alignment axis azimuths D$in$ and D2$n$ are respectively set to make an angle close to 90° with the electrode directions DE1 and DE2.

However, in order to cause the liquid crystal molecules to be rotated in the same direction in the domains P1 through P4, the initial alignment axis azimuths D1$n$ and D2$n$ and directions orthogonal to the electrode directions DE1 and DE2 are respectively offset from each other in the same rotation direction by preferably greater than 0° and 10° or less (more preferably 3° or greater and 10° or less). In this embodiment, the first electrode direction DE1 in the first and third domains P1 and P3 is offset by 7° clockwise with respect to the alignment axis azimuth D2$n$ in the second and fourth domains P2 and P4. The second electrode direction DE2 in the second and fourth domains P2 and P4 is offset by 7° clockwise with respect to the alignment axis azimuth D$in$ in the first and third domains P1 and P3.

FIGS. 10(a) and (b) respectively show alignment states of the liquid crystal molecules in the absence of, and in the presence of, an applied voltage. In the absence of an applied voltage, the liquid crystal molecules are set to be aligned as shown in FIG. 10(a) in the regions corresponding to the alignment regions A1 through A4.

As can be seen from FIGS. 10(a) and (b), when a voltage is applied, the liquid crystal molecules LC in adjacent domains are rotated in the same direction while keeping the state of making an angle of about 90° with each other. As a result, among the rotated liquid crystal molecules LC', the liquid crystal molecules LC' in adjacent axis domains have alignment axis azimuths making an angle of about 90° with each other. FIG. 10(c) shows a light transmission state in the alignment state shown in FIG. 10(b). A paler colored area transmits more light, and a darker colored area transmits less light. FIG. 10(c) also shows a light-blocking portion (black matrix BM) provided in the counter substrate 60 described later.

In this embodiment also, the initial alignment axis azimuth in the first domain P1 is set to be the same as the initial alignment axis azimuth D1 in the third domain P3, but the initial alignment azimuth in the first domain P1 is set to be different by 180° from that in the third domain P3. The initial alignment axis azimuth in the second domain P2 is set to be the same as the initial alignment axis azimuth D2 in the fourth domain P4, but the initial alignment azimuth in the second domain P1 is set to be different by 180° from that in the fourth domain P4. Such an alignment allows the liquid crystal molecules in the domains P1 through P4 to be rotated more smoothly.

Examples and Comparative Example

Hereinafter, with reference to FIG. 11 through FIG. 15, wavelength dependence of voltage-transmittance characteristics (VT characteristics) of a liquid crystal display device of a conventional FFS mode (comparative example) and liquid crystal display devices in Embodiments 1 through 3 (examples 1 through 3) will be described.

In the comparative example and examples 1 through 3, the liquid crystal display devices are set to have a retardation d·Δn of 300 nm (value with respect to the light having a wavelength of 589 nm) by appropriate selection of the thickness d of the liquid crystal layer and the birefringence Δn of the liquid crystal material.

First, the comparative example will be described. As shown in FIG. 11(a), the liquid crystal display device in the comparative example is of a dual domain FFS mode. A positive liquid crystal layer is used as the liquid crystal layer. In both of the first domain P1 and the second domain P2, the initial alignment axis azimuth is set to be in the vertical direction. When a voltage is applied, the liquid crystal molecules LC are rotated in opposite directions to each other. As can be seen from FIG. 11(a), in the comparative example, angle α1 (=α2) of the elongated electrode portions with respect to the vertical direction of the pixel is set to about 7°. As shown in FIG. 11(b), the liquid crystal molecules LC may occasionally have a pretilt angle of β with respect to the principal face XY of the alignment film (substrate plane). In the comparative example shown in FIG. 11(a), an alignment film is provided such that the liquid crystal molecules are aligned in a single direction (azimuth) by rubbing or the like. Specifically, in both of the domains P1 and P2, the initial alignment azimuth of the liquid crystal molecules is set to φ=90° as shown in FIG. 11(c).

FIG. 12(a) shows voltage-transmittance characteristics (VT characteristics) of the comparative example when the display is viewed in the normal direction (z axis direction shown in FIG. 11(c)). FIG. 12(b) and FIG. 12(c) respectively show VT characteristics of the comparative example when the display is viewed in an oblique direction with a polar angle θ=75° and an azimuth angle φ=45° (see FIG. 11(c)), and VT characteristics of the comparative example when the display is viewed in an oblique direction with a polar angle θ=75° and an azimuth angle φ=135°.

As can be seen from FIG. 12(a), in the comparative example, when the display is viewed in the direction normal to the substrate, the voltage-transmittance characteristics (VT characteristics) for light of wavelengths of 650 nm (red), 550 nm (green) and 450 nm (blue) are relatively similar to each other for display of black to grayscale tones. By contrast, as can be seen from FIGS. 12(b) and (c), when the display is viewed in an oblique direction (θ=75°, φ=45° or θ=75°, φ=135°), the VT characteristics for light of different wavelengths are dissimilar for display of black to grayscale tones. As a result, a phenomenon where certain colors are viewed as stronger (or weaker) than when the display is viewed from the front (normal direction), namely, a color shift, occurs.

When the applied voltage is relatively high, there is deviation in the VT characteristics between when the display is viewed in the normal direction and when the display is viewed in the oblique directions. However, a white voltage is likely to be set lower than a maximum-transmittance voltage, and a color shift is relatively unlikely to occur at this voltage. The wavelength dependence of the VT characteristics during white display can be properly adjusted through a data signal correction based on the wavelength dependence when the display is viewed in the normal direction, but some coloring is observed because of different characteristics between when the display is viewed in the normal direction and when the display is viewed in the oblique directions.

Figure 13:
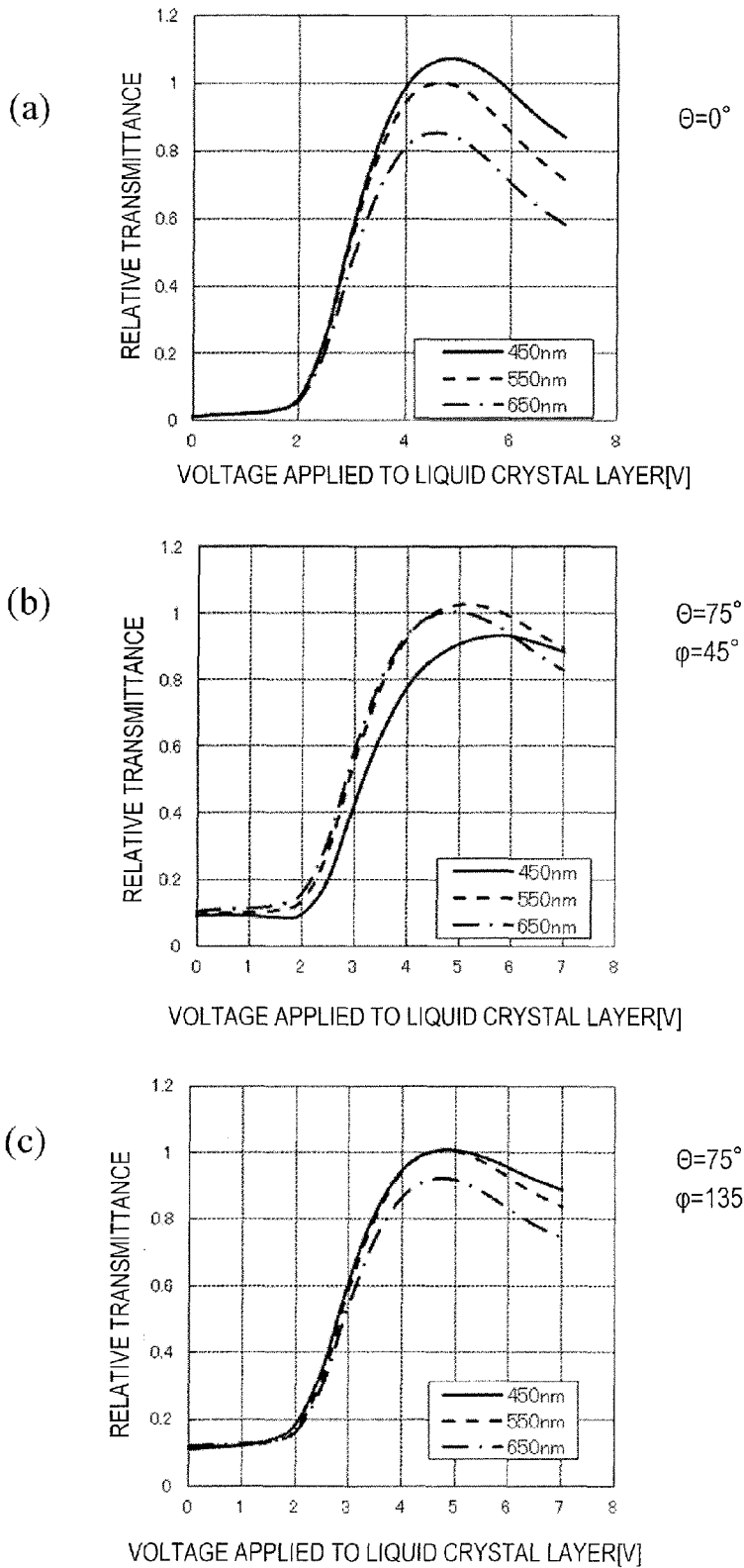
Figure 15:
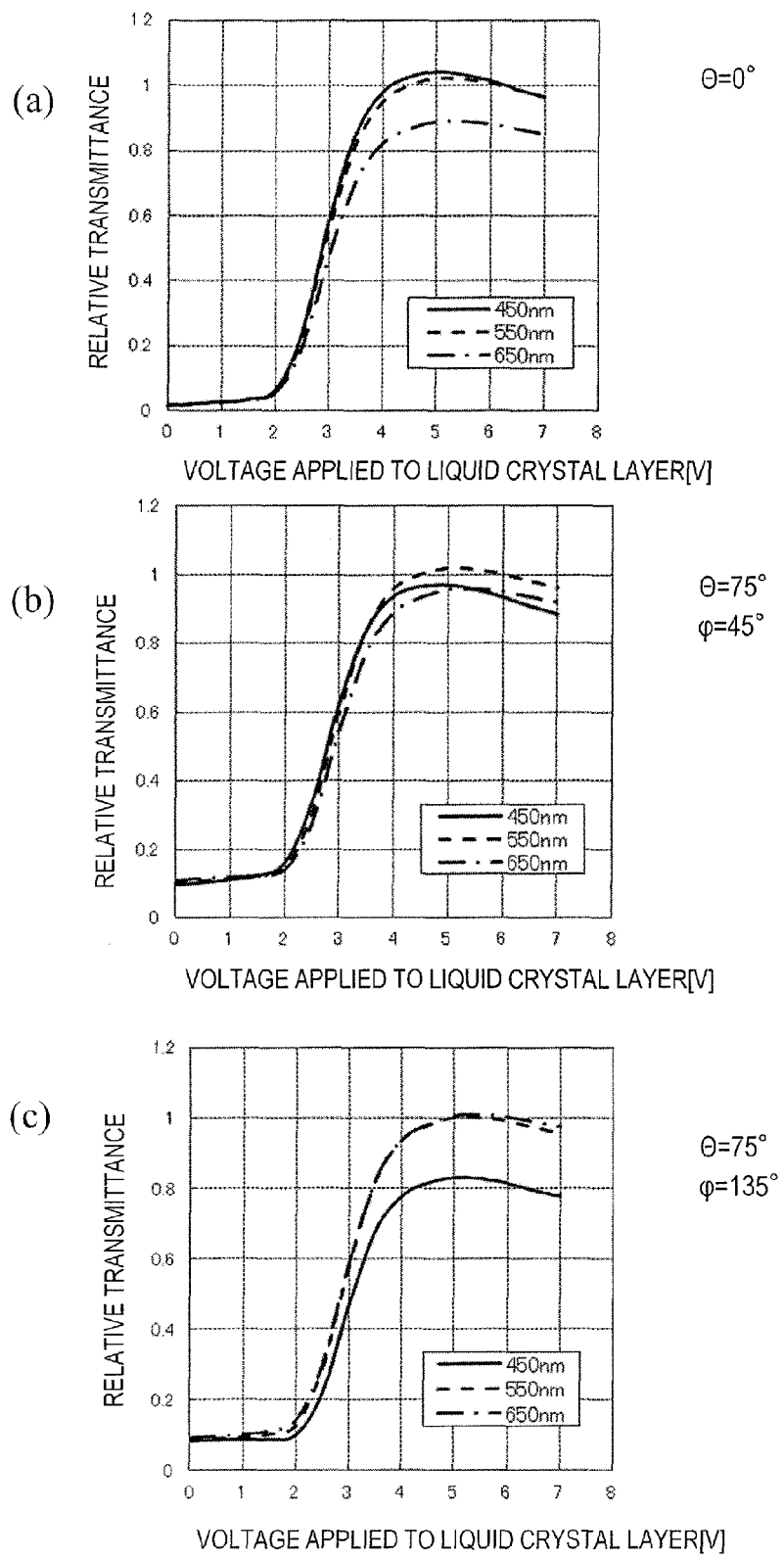

Now, the examples will be described. FIG. 13 through FIG. 15 are respectively VT graphs of the liquid crystal display devices in examples 1 through 3 (Embodiments 1 through 3).

FIG. 13(a) shows voltage-transmittance characteristics of example 1 when the display is viewed in the normal direction. FIG. 13(b) and FIG. 13(c) respectively show VT characteristics of example 1 when the display is viewed in a direction with a polar angle θ=75° and an azimuth angle φ=45°, and VT characteristics of example 1 when the display is viewed in a direction with a polar angle θ=75° and an azimuth angle φ=135°.

As can be seen from FIG. 13(a), in example 1, when the display is viewed in the direction normal to the substrate, the voltage-transmittance characteristics for light of wavelengths of 650 nm (red), 550 nm (green) and 450 nm (blue) are relatively similar to each other. As can be seen from FIGS. 13(b) and (c), when the display is viewed in the oblique directions also, the VT characteristics for light of different wavelengths are similar to each other for display of black to grayscale tones. Therefore, a phenomenon where certain colors are viewed as stronger (or weaker) is unlikely to occur. When the display is viewed in the oblique directions, a similar hue is observed to when the display is viewed from the front, thus suppressing a color shift.

FIGS. 14(a) through (c) and FIGS. 15(a) through (c) respectively show VT characteristics in examples 2 and 3. As can be seen from these figures, a color shift, which would have occurred when the display is viewed in an oblique direction, is suppressed.

In the liquid crystal display devices in the embodiments according to the present invention, the retardation d·Δn and the thickness d of the liquid crystal layer can be set to any value in a relatively wide range. Hereinafter, this will be described specifically.

Figure 16:
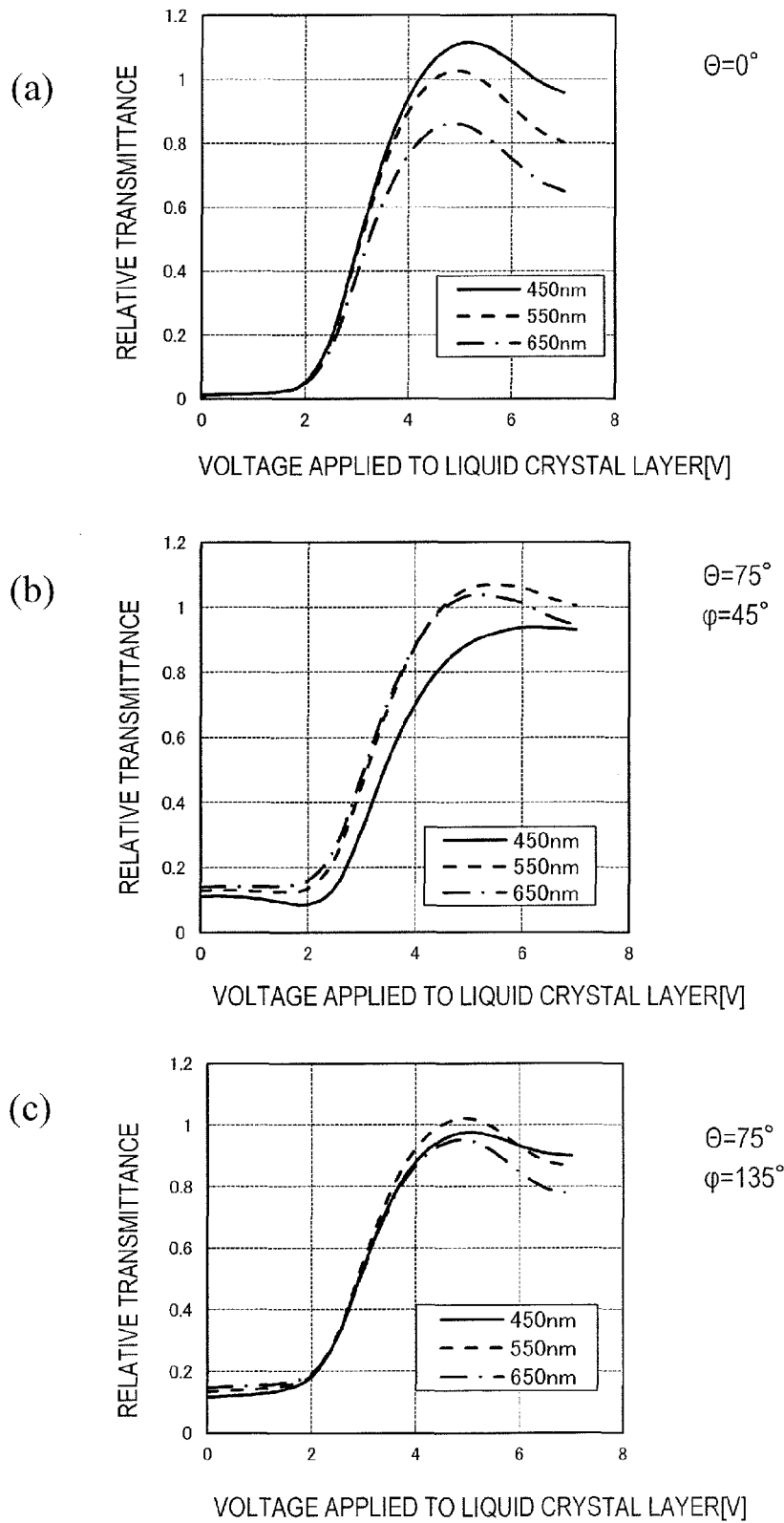
Figure 17:
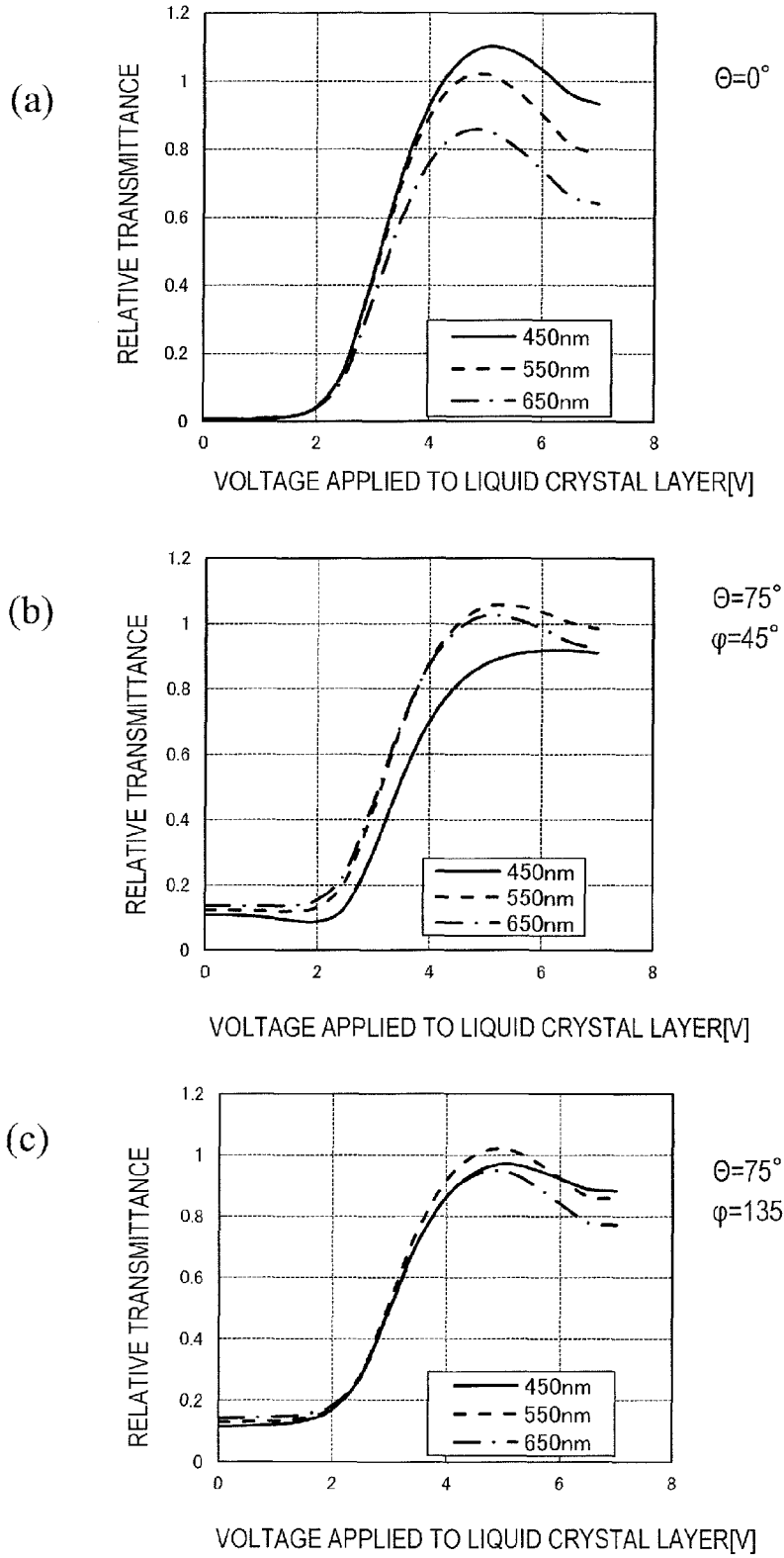
Figure 18:
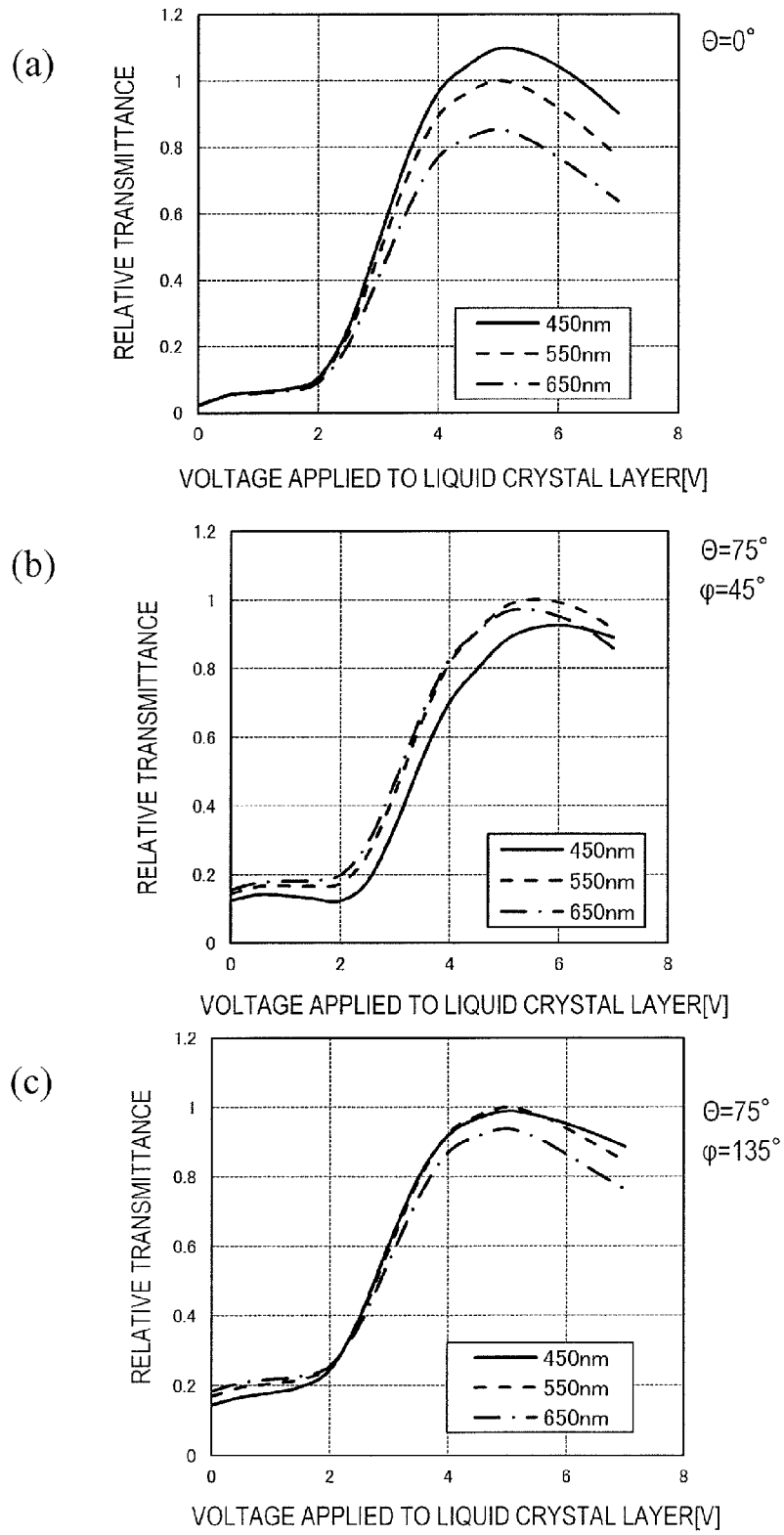

FIG. 16 through FIG. 18 respectively show VT characteristics of liquid crystal display devices in Embodiment 1. Liquid crystal materials having a birefringence Δn=0.106 (FIG. 16), 0.065 (FIG. 17) and 0.13 (FIG. 18) were respectively used, and the retardation d·Δn was set to 300 nm (value with respect to the light having a wavelength of 589 nm; this is also applicable to the cases described below). The VT characteristics were obtained when the display was viewed in the normal direction (FIG. 16(a), FIG. 17(a), FIG. 18(a)), in a direction with a polar angle θ=75° and an azimuth angle φ=45° (FIG. 16(b), FIG. 17(b), FIG. 18(b)), and in a direction with a polar angle θ=75° and an azimuth angle φ=135° (FIG. 16(c), FIG. 17(c), FIG. 18(c)). In FIG. 16, FIG. 17 and FIG. 18, the thickness d of the liquid crystal layer was 2.83 μm, 4.62 μm and 2.31 μm, respectively.

As can be seen from FIGS. 16(a) through (c), FIGS. 17(a) through (c) and FIGS. 18(a) through (c), the structure of Embodiment 1 was confirmed to suppress a color shift with any of the liquid crystal materials and any of the thicknesses of the liquid crystal layer. In a liquid crystal display device in Embodiment 1, the liquid crystal layer may be set to have a thickness of, for example, about 3 μm. In the case where the liquid crystal layer has such a small thickness, the response speed of the liquid crystal molecules in the lateral electric field mode can be increased.

Patent Document 3 describes setting the thickness of the liquid crystal layer to 4.5 μm. When the thickness of the liquid crystal layer is too thick in a liquid crystal display device of a lateral electric field mode, the response speed of the liquid crystal molecules to the application of a voltage may not be sufficiently high. By contrast, in the structure of the embodiments according to the present invention, the thickness of the liquid crystal layer may be set to 3 μm or less by, for example, using a liquid crystal material having a birefringence of 0.106 and setting the retardation d·Δn to 300 nm, so that a high response speed can be realized.

Figure 19:
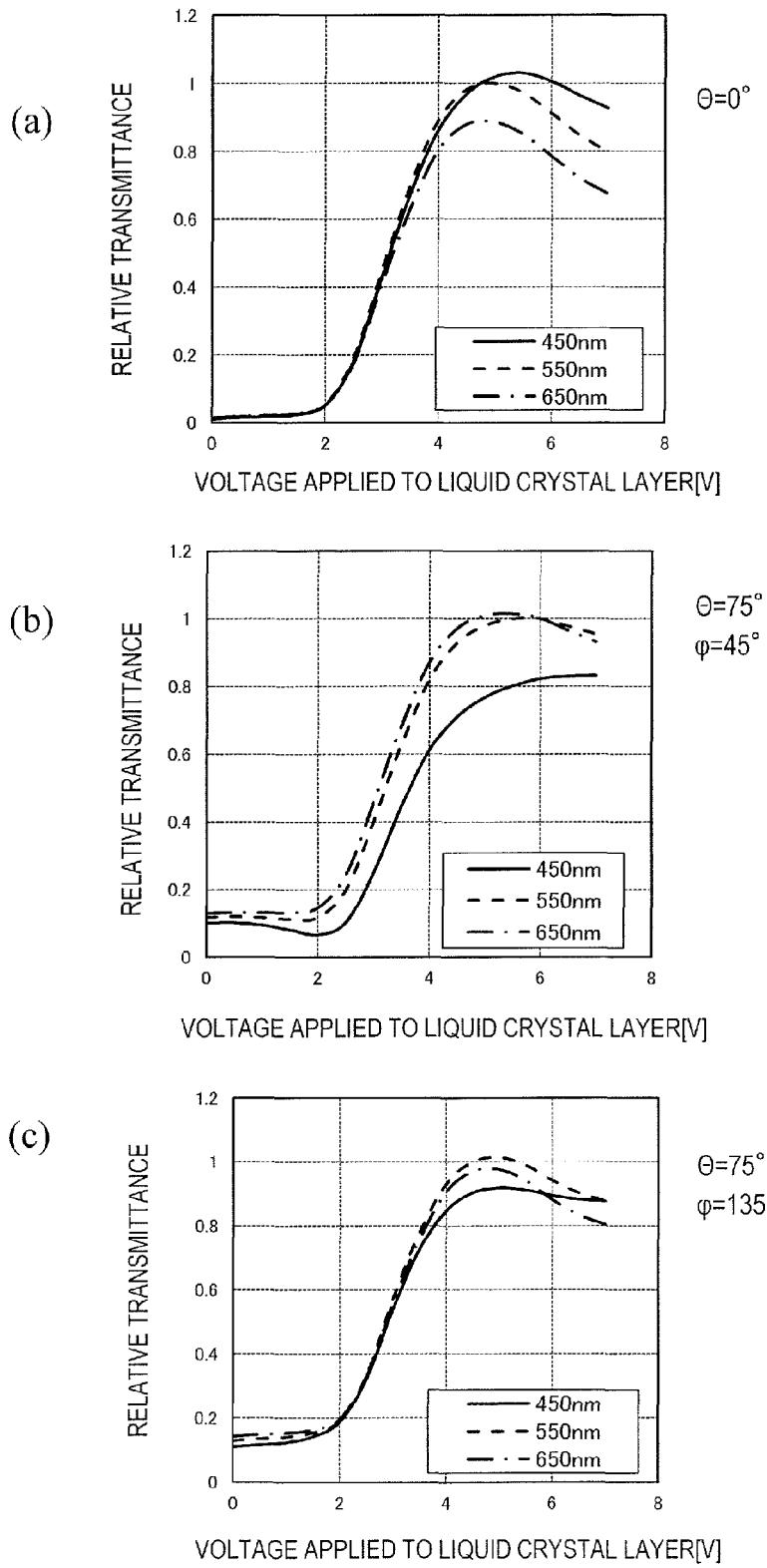

FIG. 19 through FIG. 21 respectively show VT characteristics of liquid crystal display devices in which a liquid crystal layer having a birefringence Δ=0.106 as in FIG. 16 was used. The retardation d·Δn was set to 330 nm, 350 nm and 280 nm, respectively. The VT characteristics were obtained when the display was viewed in the normal direction (FIG. 19(a), FIG. 20(a), FIG. 21(a)), in a direction with a polar angle θ=75° and an azimuth angle φ=45° (FIG. 19(b), FIG. 20(b), FIG. 21(b)), and in a direction with a polar angle θ=75° and an azimuth angle φ=135° (FIG. 19(c), FIG. 20(c), FIG. 21(c)).

As can be seen from FIGS. 16(a) through (c), FIGS. 19(a) through (c), FIGS. 20(a) through (c) and FIGS. 21(a) through (c), the structure of Embodiment 1 was confirmed to suppress a color shift in the case where the retardation is set to any value in the range of 280 to 350.

VT characteristics were obtained in the following liquid crystal display devices. The retardation d·Δn was set to a value in the range of 280 nm to 350 nm as described above, liquid crystal materials having a birefringence Δn of 0.065, 0.106 and 0.13 were respectively used, and the thickness of the liquid crystal layer was set to a value in the range of 2.15 μm to 5.38 μm. In any of the cases, the color shift was alleviated. Therefore, the thickness of the liquid crystal layer may be set to a value in the range of 2.15 to 5.38 μm. It is preferable to set the thickness of the liquid crystal layer to 4 μm, more preferably to 3 μm or less, in which case the response speed is expected to be increased.

Hereinafter, a method for producing of the liquid crystal display devices 101 through 103 in the embodiments according to the present invention will be described.

The TFT substrate 50 and the counter substrate 60 can be produced by a method substantially the same as a conventional method. The gate insulating film 20, the first protection film 21 and the second protection film 22 of the TFT substrate 50 may be formed of an $SiN_x$ film having a thickness of 0.2 μm to 0.5 μm. The gate bus line 2, the source bus line 4 and so on may be formed of a TiN/Al/TiN multilayered metal film having a thickness of 0.4 μm. The organic interlayer insulating film 24 may be formed of an acrylic material to a thickness of 2.5 μm. The pixel electrode 18 and the common electrode 16 may be formed of an ITO film or the like having a thickness of 0.1 μm.

The pixel electrode 18 includes the plurality of first electrode portions 181 extending parallel to each other in the domain P1 and the plurality of second electrode portions 182 extending parallel to each other in the domain P2. The first and second electrode portions 181 and 182 are set to have a width of, for example, about 0.1 μm. An interspace between the first electrode portions 181 (or width of the slits) and an interspace between the second electrode portions 182 (or width of the slits) may be set to, for example, about 4.0 μm. The pixel electrode 18 can be easily formed to have a shape shown in FIG. 3 or FIG. 7 by patterning performed by use of a resist mask of an appropriate shape in a known electrode patterning step.

The black matrix 32 of the counter substrate 60 may be formed of a black resin to a thickness of 1.6 μm, and the color filters 33R, 33G and 33B of respective colors are set to have a thickness of 1.5 μm. The organic planarization film 34 may be formed of an acrylic material to a thickness of 2.0 μm, and the antistatic transparent conductive film 36 may be formed of an ITO film having a thickness of 20 nm. The transparent conductive film 36 may be formed by a sputtering technique following a liquid crystal injection step.

Hereinafter, steps of producing the photoalignment films 28 and 38 will be described. In this embodiment, the photoalignment films 28 and 38 each have the first alignment region A1, the second alignment region A2, the third alignment region A3 and the fourth alignment region A4 adjacent in the horizontal and the vertical directions, in correspondence with the four domains P1, P2, P3 and P4. The alignment azimuths in the first alignment region A1 and the second alignment region A2 are substantially orthogonal to each other, and the alignment azimuths in the third alignment region A3 and the fourth alignment region A4 are substantially orthogonal to each other. Such alignment films are produced as follows, for example.

First, a material of the photoalignment films is applied to a surface of the TFT substrate by a spin coating technique or the like and is baked, thereby obtaining a transparent resin film having a thickness of, for example, 0.06 to 0.08 μm. More specifically, a photoalignment film material (e.g., an acrylic chalcone alignment film) is mixed in γ-butyrolactone so as to result in a solid concentration of approximately 3.0 wt %. The resultant mixture is applied to the TFT/counter substrate installed in a spin coater while a rotation rate of the spin coater is adjusted such that the thickness of the resultant film is 60 nm to 80 nm (e.g., to a rotation rate of 1500 to 2500 rpm). Then, the resultant TFT/counter substrate is subjected to a bake treatment on a hot plate; namely, is pre-baked (e.g., at 80° C. for 1 minute) and post-bake (e.g., at 180° C. for 1 hour).

Figure 22:
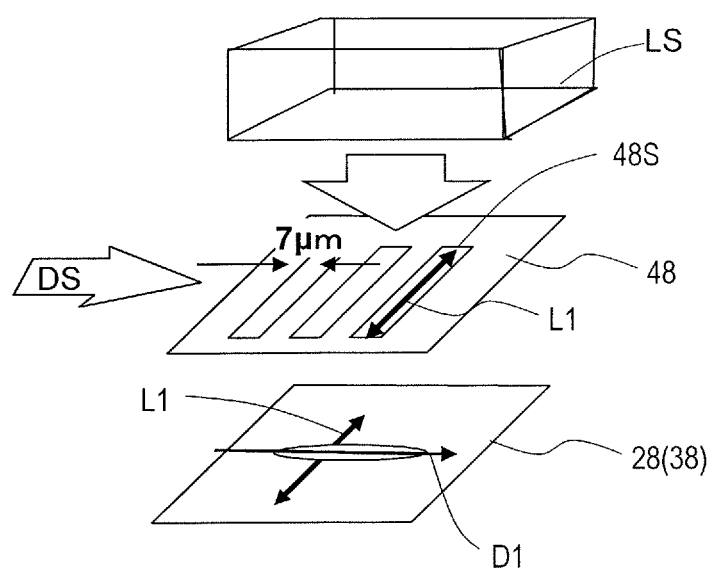
FIG. 22 shows a production step of a photoalignment film in an embodiment according to the present invention.

Then, as shown in FIG. 22, the photoalignment film material is irradiated with linearly polarized ultraviolet (polarized UV) having a polarization direction L1 via a mask 48 having a plurality of parallel slits 48S in a predetermined direction. Thus, a photoalignment film is formed. For example, the mask 48 having slits 48S with a width of about 7 μm is located between a UV light source LS and the substrate (alignment film 28), and the substrate is irradiated with polarized UV at an irradiation energy set to 1.5 J/cm². During this process, the substrate is scanned in a predetermined direction DS at a rate of, for example, 35 μm/sec by using the UV light source LS and the slit mask 48. Thus, the entire alignment film can be subjected to an alignment treatment. In this embodiment, a photoalignment film which exhibits a liquid crystal alignment ability in a direction orthogonal to the direction of polarized UV irradiation (polarization direction L1) is used.

In the above process, the first and third alignment regions (first and third domains P1 and P3) are irradiated with ultraviolet, whereas the second and fourth alignment regions (second and fourth domains P2 and P4) are not irradiated with ultraviolet, using a known stepper. Thus, the first and third alignment regions can be selectively supplied with a regulating force that aligns the liquid crystal molecules in the first alignment axis azimuth (direction orthogonal to the polarization direction L1).

Next, the second and fourth alignment regions are selectively irradiated with ultraviolet having a polarization direction different by about 90° from the polarization direction of the ultraviolet used to irradiate the first and third alignment regions, by using another mask having a plurality of slits extending in a different direction from (substantially orthogonal direction to) that of the slits 48S of the mask 48. As a result, a photoalignment film can be formed which has a different alignment axis azimuth in the first and third alignment regions from that in the second and fourth alignment regions.

It should be noted that the first alignment region and the third alignment region have the same alignment axis azimuth, but have alignment azimuths that are different from each other by 180°. The alignment regions having such an antiparallel relationship can be formed by irradiating the first alignment region and the third alignment region with ultraviolet in different directions. More specifically, ultraviolet is directed along a plane that is parallel to the direction in which the slits 48S of the mask 48 extend and also parallel to the normal to the panel plane. For forming the first alignment region, the ultraviolet is directed in a first direction having a predetermined angle with respect to the normal to the panel plane. For forming the second alignment region, the ultraviolet is directed in a second direction symmetric to the first direction with respect to the normal to the panel plane.

Use of a photoalignment film is advantageous because an alignment film having different alignment azimuths in different alignment regions can be formed relatively easily by controlling the polarization direction of the ultraviolet used to irradiate the photoalignment film. By using an alignment film thus formed, the liquid crystal molecules can be aligned such that major axis directions thereof in adjacent domains are substantially orthogonal to each other in the absence of an applied voltage in the 4-domain structure.

Nonetheless, it is not absolutely necessary to use a photoalignment film to obtain an alignment film having different alignment azimuths in different domains. For example, the first alignment region may be rubbed in a first direction in the state where only the first alignment region is exposed while the other alignment regions are covered with a resist to form the first alignment region, and then the third alignment region may be rubbed in a direction opposite to the first direction in the state where only the third alignment region is exposed while the other alignment regions are covered with a resist to form the third alignment region. Similarly, the second and fourth alignment regions can be formed by performing rubbing in a second direction (typically, direction orthogonal to the first direction) and in a direction opposite to the second direction.

After the TFT substrate 50 and the counter substrate 60 are formed, a liquid crystal material is sealed in between these substrates to produce a liquid crystal panel. Steps of panel production can also be performed by a known method. A specific example will be described below. First, a sealing material is applied, by use of a dispenser, to an area around a region of the counter substrate 60 corresponding to one panel. As the sealing material, a thermosetting resin can be used.

After the sealing material is applied, a pre-bake step (e.g., at 80° C. for 5 minutes) is conducted. Spherical spacers with a desired diameter (3.3 µm in this example) are dry-spread on the TFT substrate 50. Thereafter, the TFT substrate 50 and the counter substrate 60 are attached together. After a vacuum press step or a rigid press step is performed, a post-bake step (e.g., at 180° C. for 60 minutes) is conducted.

Usually, a plurality of liquid crystal panels are formed from one piece of large-sized mother glass. Therefore, after the counter substrate 60 and the TFT substrate 50 are attached together, a step of cutting the mother glass into the plurality of panels is conducted.

Each panel has a gap is formed between the substrates, and the thickness thereof is maintained by the spacers. The panel is in a state of empty cell. A liquid crystal material is injected into this empty cell. The liquid crystal injection step is conducted as follows. An appropriate amount of liquid crystal material is put onto an injection tray, and the injection tray is set in a vacuum chamber together with the empty cell. The vacuum chamber is evacuated (e.g., for 60 minutes) to be in a vacuum state, and then the liquid crystal material is injected by dipping (e.g., for 60 minutes). After the cell with the liquid crystal injected thereinto is taken out of the chamber, the injection inlet is cleaned of any liquid crystal material adhering thereto. Then, a UV-curable resin is applied to the injection inlet and cured through UV irradiation to seal the injection inlet. Thus, the production of the liquid crystal panel is completed.

In the liquid crystal panel thus produced, a liquid crystal material having, for example, a birefringence $\Delta n=0.10$ and a dielectric anisotropy $\Delta\varepsilon=5.0$ (positive liquid crystal material) is used. The cell thickness d is set to 3.0 µm. In this case, the retardation is set to $d \cdot \Delta n=300$ nm.

Figure 23:
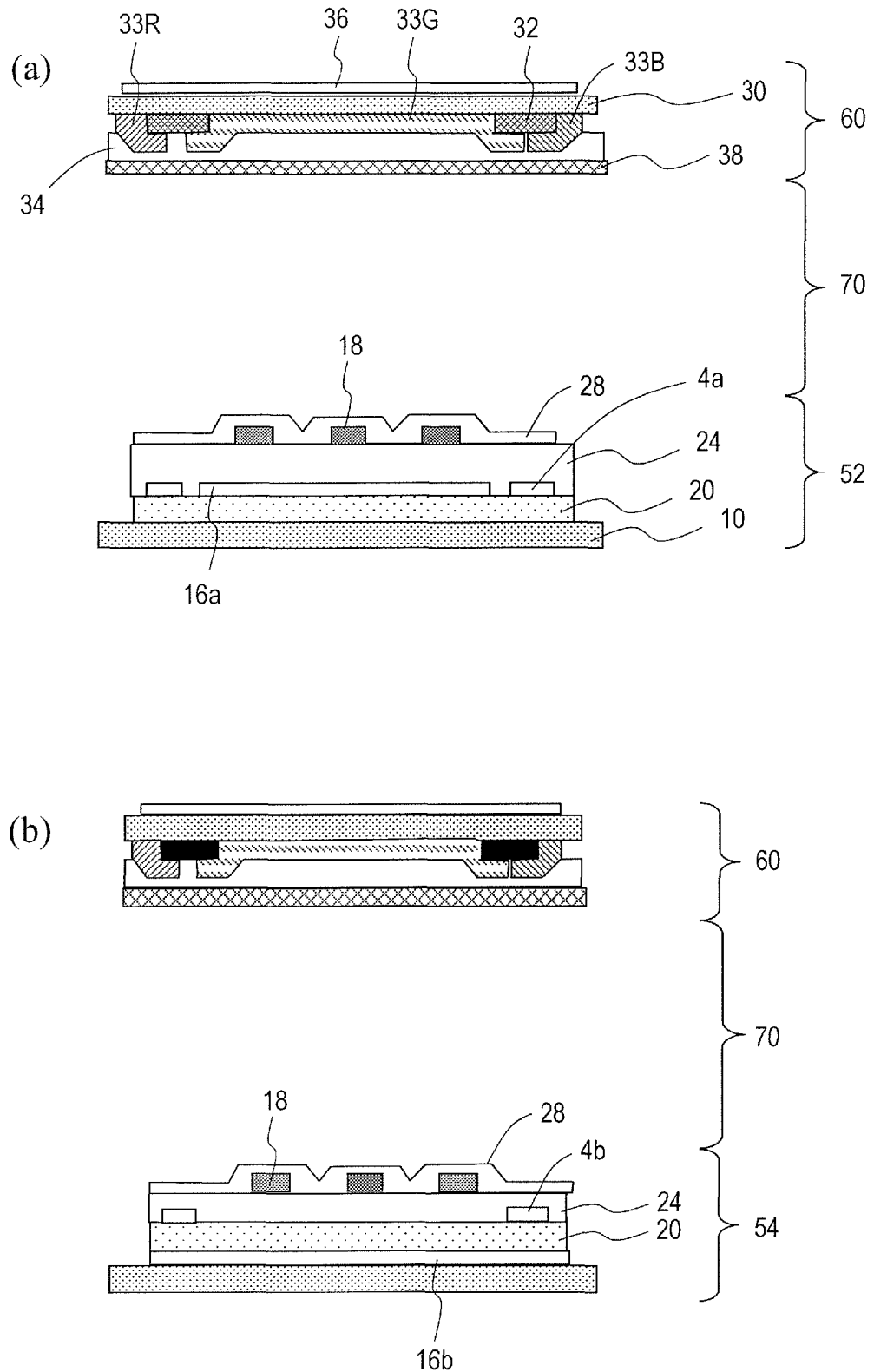
FIG. 23 are cross-sectional views showing liquid crystal display devices in other embodiments according to the present invention, wherein FIGS. 23(a) and (b) show different embodiments.

Embodiments of the present invention have been described so far. It will be appreciated that various other modifications are possible. For example, as shown in FIG. 23(a), unlike in FIG. 2, a TFT substrate 52 may have a structure in which a source bus line 4a (and the source electrodes 14 and the drain electrodes 15) is provided in the same layer as a common electrode 16a. Alternatively, as shown in FIG. 23(b), a TFT substrate 54 may have a structure in which a source bus line 4b is provided in a layer upper to a common electrode 16b (i.e., layer between the common electrode 16b and the pixel electrode 18) that is the same layer as the gate bus line 2. In FIGS. 23(a) and (b), substantially the same elements as those of the liquid crystal display device 101 shown in FIG. 2 and FIG. 3 bear like reference numerals, and descriptions thereof are omitted.

The pixel does not need to be square, and may have a rectangular or parallelogram shape. In the case where, for example, the pixel is rectangular, the pixel electrodes in adjacent domains may have different structures from each other, or may have different number of elongated electrode portions from each other.

In the above, multi-domain liquid crystal display devices including four domains in one pixel have been described. Alternatively, four domains may be formed in correspondence with a plurality of pixels. These four domains may correspond to any number of pixels as long as the four domains arrayed in the horizontal and vertical directions in a 2×2 array are formed, the alignment axis azimuths in adjacent domains are substantially orthogonal to each other and the alignment axis azimuths in diagonal domains are parallel to each other. For example, one domain may correspond to one pixel, so that four pixels form the above-described four domains.

In another embodiment according to the present invention, the transmission axis and the absorption axis of the rear-side polarizing plate (and the front-side polarizing plate) may be replaced with each other. In this specification, the "polarization axis" may represent either the absorption axis or the transmission axis. In embodiments according to the present invention, the alignment direction of the liquid crystal molecules is preferably substantially parallel to the polarization axis of the rear-side (or front-side) polarizing plate (namely, to either the absorption axis or the transmission axis).

In the above, liquid crystal display devices of an FFS mode have been described. The present invention is also applicable to a liquid crystal display device of an IPS mode.

INDUSTRIAL APPLICABILITY

A liquid crystal display device in an embodiment according to the present invention is widely usable as any of various display devices, for example, medium- to small-sized display devices for mobile devices or tablet terminals, display devices for TVs or digital signage, and the like.

REFERENCE SIGNS LIST 2 gate bus line
4 source bus line
6 TFT
10, 30 transparent substrate
12 gate electrode
14 source electrode
15 drain electrode
16 common electrode
18 pixel electrode
28, 38 photoalignment film
29, 39 polarizing plate
50 TFT substrate
60 counter substrate
70 liquid crystal layer
P1 first sub pixel region (first domain)
P2 second sub pixel region (second domain)
P3 third sub pixel region (third domain)
P4 fourth sub pixel region (fourth domain)
D1 first alignment axis azimuth
D2 second alignment axis azimuth
DE1 first electrode direction
DE2 second electrode direction
AX1 transmission axis (polarization axis) of rear-side polarizing plate
AX2 absorption axis (polarization axis) of rear-side polarizing plate
LC liquid crystal molecules

The invention claimed is:

1. A liquid crystal display device of a lateral electric field mode, comprising: a liquid crystal layer; first and second substrates facing each other with the liquid crystal layer interposed therebetween; first and second polarizers located respectively in the first and second substrates; a first electrode and a second electrode located in the first substrate on the side of the liquid crystal layer; and a first alignment film provided between the first electrode/the second electrode and the liquid crystal layer so as to be in contact with the liquid crystal layer, the first alignment film regulating an alignment axis direction of liquid crystal molecules in the absence of an applied voltage; wherein:
the liquid crystal layer includes a first domain and a second domain mutually differing in terms of alignment axis azimuth of the liquid crystal molecules in the presence of an applied voltage, and also includes a third domain and a fourth domain mutually differing in terms of alignment axis azimuth of the liquid crystal molecules in the presence of an applied voltage;
the first domain and the second domain are arrayed in a vertical direction, the third domain and the fourth domain are arrayed in the vertical direction, the first domain and the fourth domain are arrayed in a horizontal direction, and the second domain and the third domain are arrayed in the horizontal direction;
the first alignment film includes a first alignment region that aligns the liquid crystal molecules in the first domain in a first alignment axis azimuth, a second alignment region that aligns the liquid crystal molecules in the second domain in a second alignment axis azimuth substantially orthogonal to the first alignment axis azimuth, a third alignment region that aligns the liquid crystal molecules in the third domain in the first alignment axis azimuth, and a fourth alignment region that aligns the liquid crystal molecules in the fourth domain in the second alignment axis azimuth; and
when a voltage is applied between the first electrode and the second electrode, the liquid crystal molecules in the first domain, the second domain, the third domain and the fourth domain are all rotated in the same direction.

2. The liquid crystal display device of claim 1, further comprising a source bus line and a gate bus line for applying a voltage to the first electrode;
wherein a direction in which at least one of the source bus line and the gate bus line extends is parallel to one of the first alignment axis azimuth and the second alignment axis azimuth.

3. The liquid crystal display device of claim 1, wherein the first electrode has a first elongated electrode portion or slit in correspondence with the first domain, the first elongated electrode portion or slit extending in a first direction; a second elongated electrode portion or slit in correspondence with the second domain, the second elongated electrode portion or slit extending in a second direction different from the first direction; a third elongated electrode portion or slit in correspondence with the third domain, the third elongated electrode portion or slit extending in the first direction; and a fourth elongated electrode portion or slit in correspondence with the fourth domain, the fourth elongated electrode portion or slit extending in the second direction.

4. The liquid crystal display device of claim 3, wherein the first direction is offset by an angle of greater than 0° and 10° or less in a first rotation direction with respect to either the first alignment axis azimuth or the second alignment axis azimuth, and the second direction is offset by an angle of greater than 0° and 10° or less in the first rotation direction with respect to either the second alignment axis azimuth or the first alignment axis azimuth.

5. The liquid crystal display device of claim 3, wherein:
the first electrode includes a plurality of the first elongated electrode portions in correspondence with the first domain, the plurality of first elongated electrode portions each extending in the first direction and electrically connected to each other, and includes a plurality of the second elongated electrode portions in correspondence with the second domain, the plurality of second elongated electrode portions each extending in the second direction and electrically connected to each other; and
the plurality of second elongated electrode portions are connected to one of the plurality of first elongated electrode portions that is located at a boundary between the first domain and the second domain.

6. The liquid crystal display device of claim 3, wherein the first, second, third and fourth elongated electrode portions each include a tip portion in a pixel outer peripheral portion, the tip portion not being connected to any other conductive member.

7. The liquid crystal display device of claim 3, wherein the first, second, third and fourth elongated electrode portions are commonly connected to a ring-shaped outer electrode portion selectively provided in the pixel outer peripheral portion.

8. The liquid crystal display device of claim 3, wherein the first alignment axis azimuth is offset by a first angle clockwise with respect to the first direction, and the second alignment axis azimuth is offset by an angle that is the same as the first angle clockwise with respect to the second direction.

9. The liquid crystal display device of claim 1, further comprising a second alignment film provided in the second substrate, the second alignment film including a fifth alignment region facing the first alignment region of the first alignment film and a sixth alignment region facing the second alignment region of the first alignment film;

wherein an alignment axis azimuth in the fifth alignment region is parallel to the first alignment axis azimuth, and an alignment axis azimuth in the sixth alignment region is parallel to the second alignment axis azimuth.

10. The liquid crystal display device of claim 1, wherein the first alignment region and the third alignment region align the liquid crystal molecules therein such that alignment azimuths thereof are different from each other by 180°, and the second alignment region and the fourth alignment region align the liquid crystal molecules therein such that alignment azimuths thereof are different from each other by 180°.

11. The liquid crystal display device of claim 1, wherein the first alignment film is a photoalignment film.

12. The liquid crystal display device of claim 1, further comprising a backlight unit provided on the first polarizer on the side opposite to the liquid crystal layer;

wherein an absorption axis of the first polarizer and the first alignment axis azimuth are substantially parallel to each other, and a transmission axis of the first polarizer and the second alignment axis azimuth are substantially parallel to each other.

13. The liquid crystal display device of claim 1, wherein:
the first substrate further includes an insulating layer located between the first electrode and the second electrode so as to cover either the first electrode and the second electrode; and
the liquid crystal molecules are rotated by an electric field generated between the first electrode and the second electrode that are electrically insulated by the insulating layer.

14. The liquid crystal display device of claim 1, wherein the liquid crystal layer has a thickness d that is 2.15 μm or greater and 5.38 μm or less.

15. The liquid crystal display device of claim 1, wherein the liquid crystal layer has a retardation d·Δn that is 280 nm or greater and 350 nm or less.

* * * * *